United States Patent
Hanzawa

(10) Patent No.: US 9,230,307 B2
(45) Date of Patent: Jan. 5, 2016

(54) IMAGE PROCESSING APPARATUS AND METHOD FOR GENERATING A HIGH RESOLUTION IMAGE

(71) Applicant: OMRON Corporation, Kyoto-Shi (JP)

(72) Inventor: Yuki Hanzawa, Nara (JP)

(73) Assignee: OMRON CORPORATION, Kyoto-shi (JP)

( * ) Notice: Subject to any disclaimer, the term of this patent is extended or adjusted under 35 U.S.C. 154(b) by 49 days.

(21) Appl. No.: 14/220,802

(22) Filed: Mar. 20, 2014

(65) Prior Publication Data

US 2014/0307971 A1 Oct. 16, 2014

(30) Foreign Application Priority Data

Apr. 15, 2013 (JP) .................. 2013-085227

(51) Int. Cl.
*G06K 9/36* (2006.01)
*G06T 5/00* (2006.01)
*G06T 3/40* (2006.01)
*G06K 9/46* (2006.01)

(52) U.S. Cl.
CPC .............. *G06T 5/003* (2013.01); *G06K 9/4676* (2013.01); *G06T 3/4053* (2013.01)

(58) Field of Classification Search
None
See application file for complete search history.

(56) References Cited

U.S. PATENT DOCUMENTS

| 2008/0019669 A1 | 1/2008 | Girshick et al. |
| 2009/0185760 A1 | 7/2009 | Okada et al. |
| 2011/0142370 A1 | 6/2011 | Joshi et al. |

FOREIGN PATENT DOCUMENTS

| JP | 2009-194896 A | 8/2009 |
| JP | 2010-073074 A | 4/2010 |

OTHER PUBLICATIONS

Extended European Search Report for Application No. 14161957.7 issued Oct. 24, 2014 (10 pages).
Nasrollahi et al., Extracting a Good Quality Frontal Face Image from a Low-Resolution Video Sequence. IEEE Transactions on Circuits and Systems for Video Technology. vol. 21, Issue 10, Oct. 2011, pp. 1353-1362.

*Primary Examiner* — Brian P Werner
(74) *Attorney, Agent, or Firm* — Nutter McClennen & Fish LLP; John J. Penny, Jr.

(57) ABSTRACT

To generate a high resolution image of higher quality depending on a target area. An image processing apparatus includes a blur amount estimating unit configured to estimate a blur amount in a set target area in each of images indicated by a plurality of low resolution image data, and a reference image selecting unit configured to select a low resolution image to be a reference for generating the high resolution image depending on the estimated blur amount.

10 Claims, 19 Drawing Sheets

OBJECT DETECTION RESULT

SALIENCY AREA ESTIMATION RESULT

FIG. 17
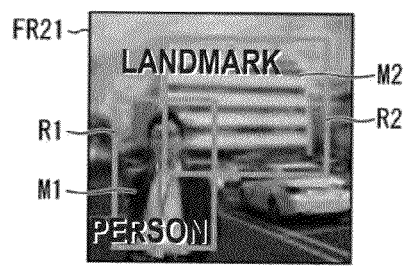
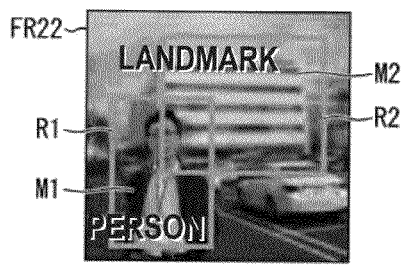
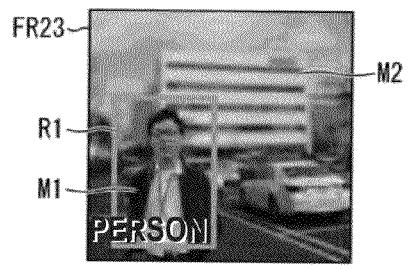
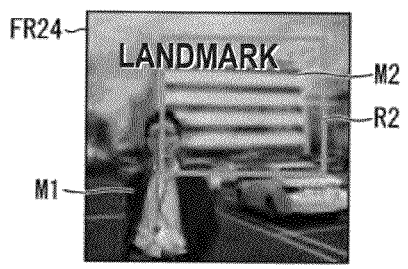
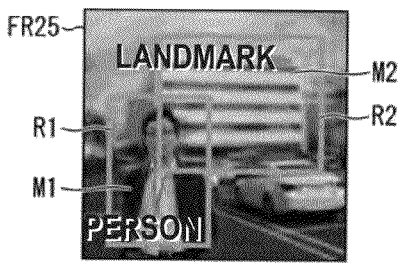

IMAGE PROCESSING APPARATUS AND METHOD FOR GENERATING A HIGH RESOLUTION IMAGE

CROSS REFERENCE TO RELATED APPLICATION(S)

This application claims the benefit of priority from Japanese Patent Application No. 2013-085227, filed 15 Apr. 2013, the entire contents of which is incorporated herein by reference for all purposes.

BACKGROUND

The present invention relates to an image processing apparatus configured to generate a high resolution image having higher resolution than low resolution images from the low resolution images, a method of controlling the image processing apparatus, and a non-transitory computer-readable recording medium.

Conventionally, super resolution techniques are known as image processing techniques for causing an image having low resolution to have high resolution. A multiframe super resolution technique is known as one of the super resolution techniques. In the multiframe super resolution technique, a plurality of low resolution images related to the same target is used to generate a single high resolution image.

More specifically, resolution increase processing is carried out by using low resolution images acquired by shifting a position of a subject or the like little by little to perform imaging so that a single high resolution image is generated.

The increase in the resolution is carried out on the basis of a reference image selected from the low resolution images. Specifically, an amount of a positional shift between the low resolution images is first calculated based on the reference image and the resolution increase processing is performed on the basis of the positional shift amount thus calculated and image data on respective low resolution images.

In many cases, a first one of the low resolution images read in order is selected as the reference image. However, a content of the high resolution image obtained by the increase in the resolution (which includes image quality and a composition) greatly depends on the reference image. Accordingly, a result of the high resolution image which is obtained differs greatly between the case in which a frame of the low resolution images which has the highest image quality is selected as the reference image and the case in which a frame of the low resolution images which has the lowest image quality is selected as the reference image.

Specific description will be given with reference to FIGS. 21A and 21B as follows. FIGS. 21A and 21B illustrate the case in which a single high resolution image is generated by using three low resolution images. FIG. 21A shows the case in which a low resolution image LP101 having the highest image quality in three low resolution images LP101, LP102 and LP103 is selected as the reference image. In the case shown in FIG. 21A, an excellent high resolution image HP101 is obtained.

On the other hand, FIG. 21B shows the case in which the low resolution image LP103 having the lowest image quality in the three low resolution images LP101, LP102 and LP103 is selected as the reference image. In the case shown in FIG. 21B, a high resolution image HP102 thus obtained is unclear.

Therefore, there is conventionally made a proposal such as selection of a reference image based on a small blur amount of a whole screen (Japanese Unexamined Patent Publication No. 2009-194896 (published on Aug. 27, 2009)).

In the field of the super resolution technique, there is further made a proposal for calculating a blur amount of each area on an image and carrying out super resolution processing in a parameter corresponding to the blur amount of every area in order to enhance image quality (Japanese Unexamined Patent Publication No. 2010-73074 (published on Apr. 2, 2010)).

Even if the reference image is selected based on the value of the blur amount of the whole image such as a small blur amount as proposed in the related art, however, an intended high resolution image may not be obtained in some cases. Specific description will be given with reference to FIGS. 22A and 22B as follows.

FIGS. 22A and 22B show two images in almost equal blur amounts of the whole image. FIG. 22A shows an image LP111 in which a person M100 is clear and a background B100 is blurred. Moreover, FIG. 22B shows an image LP112 in which the person M100 is blurred and the background B100 is clear.

Although the images LP111 and LP112 are images having almost equal blur amounts as the whole image, a natural high resolution image can be obtained from the image LP111 after the super resolution processing when they are set to be the reference images. In other words, it is possible to obtain a high resolution image having the clearer person M100 in the case in which the image LP111 having the clear person M100 is set to be the reference image than the case in which the image LP112 is set to be the reference image.

In the related art, accordingly, there is a problem in that an intended high resolution image may not be always obtained through the resolution processing by using a reference image corresponding to a target area.

SUMMARY

In consideration of the problem, there is a need to provide an image processing apparatus capable of enhancing image quality of a high resolution image by selecting a proper reference image corresponding to a target area in a multiframe super resolution processing, a method of controlling an image processing apparatus, an image processing program and a recording medium thereof.

In an embodiment, there is an image processing apparatus to generate a high resolution image having higher resolution than a plurality of low resolution images from the low resolution images. The image processing apparatus includes a target area setting unit configured to set a target area which is an area to be noted in each of the low resolution images, an image index estimating unit configured to estimate an image index representing a property of an image in the target area set in each of the low resolution images, and a selecting unit configured to select any of the low resolution images which is a reference for generating the high resolution image from the low resolution images depending on the estimated image index.

BRIEF DESCRIPTION OF THE DRAWINGS

FIG. 17 is a view showing the method of matching object detection results between frames;

DETAILED DESCRIPTION

Figure 1:
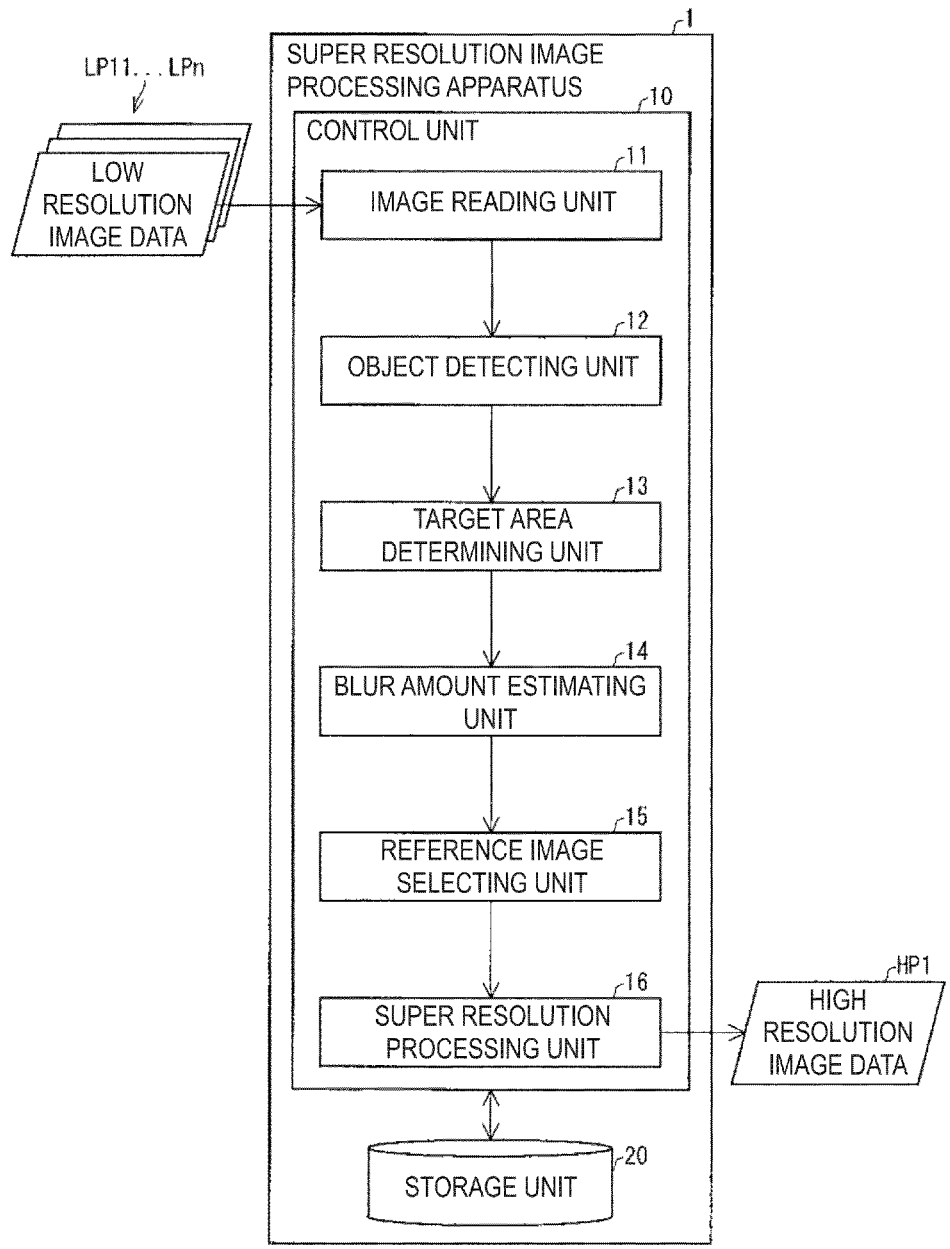
FIG. 1 is a functional block diagram showing an example of a schematic structure of a super resolution image processing apparatus according to an embodiment.

An embodiment according to the present invention will be described with reference to FIGS. 1 to 4. First of all, a super resolution image processing apparatus 1 will be described with reference to FIG. 1. FIG. 1 is a functional block diagram showing an example of a schematic structure of the super resolution image processing apparatus 1.

As shown in FIG. 1, the super resolution image processing apparatus 1 serves to input a plurality of low resolution image data LP11 to LPn to carry out super resolution processing, thereby generating high resolution image data HP1.

Figure 2:
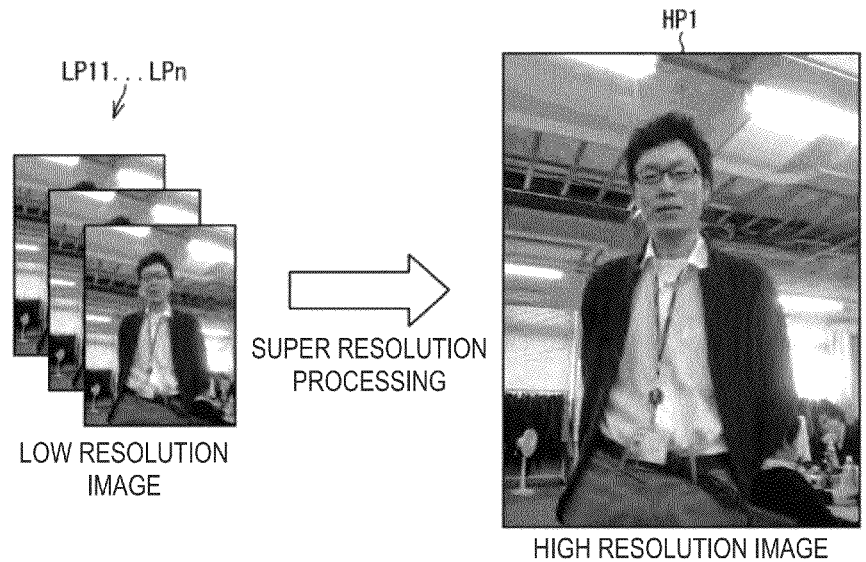
FIG. 2 is a view illustrating summary of multiframe super resolution processing.

Summary of the super resolution processing to be executed by the super resolution image processing apparatus 1 will be described with reference to FIG. 2. FIG. 2 is a view illustrating summary of multiframe super resolution processing. As illustrated in FIG. 2, in the multiframe super resolution processing, the super resolution processing is carried out based on a shift amount between images to generate the single high resolution image data HP1 with reference to a plurality of low resolution image data LP1 to LPn having a positional shift. The low resolution image data LP11 to LPn may be images which are continuous in time and space.

The super resolution image processing apparatus 1 includes a control unit 10 and a storage unit 20. The storage unit 20 serves to store various data and a program.

The control unit 10 serves to totally control various functions in the super resolution image processing apparatus 1. The function of the control unit 10 is implemented by execution of the program stored in the storage unit 20 or the like by means of a processing device such as a CPU (Central Processing Unit). For example, the control unit 10 has a super resolution processing function.

More specifically, the control unit 10 includes an image reading unit 11, an object detecting unit 12, a target area determining unit 13, a blur amount estimating unit 14, a reference image selecting unit 15 and a super resolution processing unit 16.

The image reading unit 11 serves to read the low resolution image data LP11 to LPn to be input. The low resolution image data LP11 to LPn may be stored in the storage unit 20, may be supplied from a removable external storage medium or may be supplied via a wired or wireless communication network. In the case in which the super resolution image processing apparatus 1 includes an imaging unit for picking up an image of a subject, moreover, the image reading unit 11 may acquire the low resolution image data LP11 to LPn from the imaging unit.

Furthermore, the image reading unit 11 may start to read an image in response to an operation input from a user through an input interface (not shown) such as a touch panel, a keyboard or a mouse. In addition, the image reading unit 11 may automatically start to read an image periodically or nonperiodically, or after generation of any event, for example, a timer.

The image reading unit 11 supplies the read low resolution image data LP11 to LPn to the object detecting unit 12.

The object detecting unit 12 serve to analyze images of the low resolution image data LP11 to LPn respectively, thereby detecting an object included in the images. The object to be detected by the object detecting unit 12 may be a specific object or a general object, for example, a human face, a human body, a landmark or the like. The object detecting unit 12 may detect only the specific person by face authentication. Moreover, the object detecting unit 12 may detect the object by pattern recognition.

In addition, the object detecting unit 12 may detect a plurality of objects from an image indicated by the single low resolution image data LP11.

In the case in which the object detecting unit 12 detects an object, moreover, it may set an object detection area (which is also referred to as a detection frame) indicating that the object is present. The object detection area may take a rectangular shape including an object or an object position deciding unit 24 may detect a contour of an object to set the detected contour as the object detection area of the object.

Furthermore, the object detecting unit 12 supplies a result of object detection processing to the target area determining unit 13.

The target area determining unit 13 determines an area in which blur amount estimation processing is to be executed based on the result of the object detection processing for the respective low resolution image data LP11 to LPn. Specifically, the target area determining unit 13 determines the area in which the object is detected as the area in which the blur amount estimation processing is to be executed (which will be hereinafter referred to as a target area). When the object detecting unit 12 detects a plurality of objects by the object detection processing, the target area determining unit 13 may set target areas for the detected objects. The target area determining unit 13 gives a notice of the determined target areas to the blur amount estimating unit 14.

The blur amount estimating unit 14 estimates a blur amount in the target area determined for each of the low resolution image data LP11 to LPn. For example, the technique described in the Japanese Unexamined Patent Publication No. 2009-194896 can be used for estimating the blur amount in the blur amount estimating unit 14. The blur amount estimating unit 14 supplies the estimated blur amount to the reference image selecting unit 15.

The reference image selecting unit 15 selects a reference image to be a reference of the super resolution processing from the low resolution image data LP11 to LPn based on the blur amount of the target area. The reference image is also referred to as a reference frame, a target frame, a target image or the like. The reference image selecting unit 15 selects, as the reference image, any of the low resolution image data which has a smaller blur amount. The reference image selecting unit 15 gives a notice of the selected reference image to the super resolution processing unit 16.

The super resolution processing unit 16 executes the super resolution processing using the low resolution image data LP11 to LPn based on the selected reference image. The super resolution processing unit 16 outputs the high resolution image data HP1 generated by the super resolution processing. In the case in which the super resolution image processing apparatus 1 includes a display unit, the super resolution processing unit 16 may display the high resolution image data HP1 on the display unit. Moreover, the super resolution processing unit 16 may store the generated high resolution image data HP1 in the storage unit 20 or may transmit the high resolution image data HP1 to an outside via a wired or wireless communication network.

(Summary of Reference Image Selection Processing in Super Resolution Image Processing Apparatus)

Next, summary of reference image selection processing in the super resolution image processing apparatus 1 will be described with reference to FIGS. 3A and 3B.

Figures 3A, 3B:
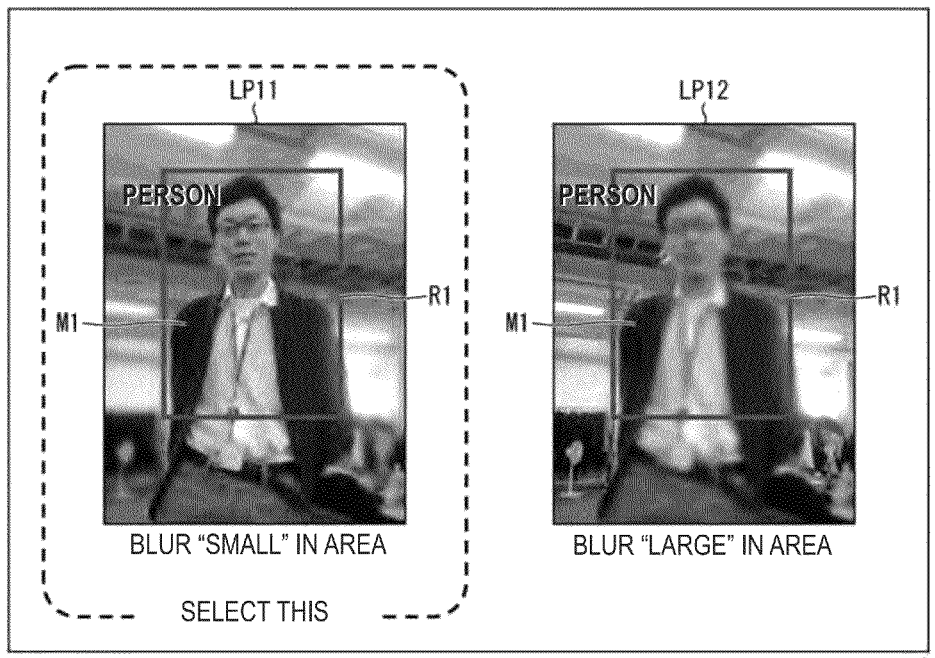
FIGS. 3A and 3B are views showing summary of reference image selection processing in the super resolution image processing apparatus, FIG. 3A showing low resolution image data having a small blur in a target area and FIG. 3B showing low resolution image data having a large blur in the target area.

FIGS. 3A and 3B illustrate images indicated by the low resolution image data LP11 and LP12, respectively.

The low resolution image data LP11 and LP12 include a person M1 respectively and a face part is detected by the object detecting unit 12. Moreover, a target area is set, by the target area determining unit 13, to an object detection area R1 set to the detected part, respectively.

The blur amount estimating unit 14 estimates the blur amounts in the respective target areas of the images indicated by the low resolution image data LP11 and LP12.

The blur amount in the target area (the object detection area R1) is small in the low resolution image data LP11, while the blur amount is large in the target area (the object detection area R1) in the low resolution image data LP12.

For this reason, the reference image selecting unit 15 selects, as a reference image, the low resolution image data LP11 having a smaller blur amount in the target area.

(Flow of Processing in Super Resolution Image Processing Apparatus)

Figure 4:
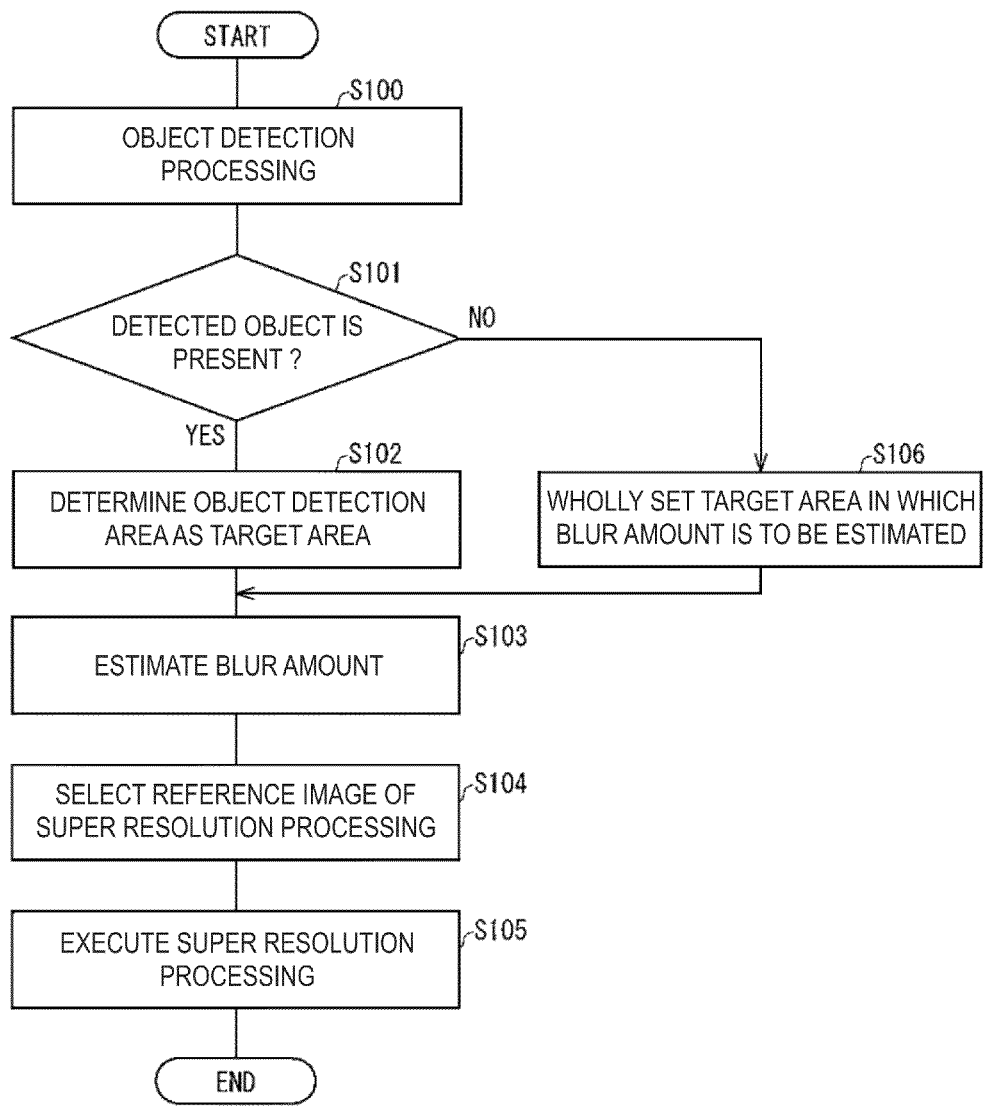
FIG. 4 is a flowchart illustrating a flow of super resolution processing of the super resolution image processing apparatus.

Next, a flow of the super resolution processing in the super resolution image processing apparatus 1 will be described with reference to FIG. 4. FIG. 4 is a flowchart illustrating the flow of the super resolution processing in the super resolution image processing apparatus 1 according to an embodiment.

As shown in FIG. 4, first of all, the object detecting unit 12 executes the object detection processing for the low resolution image data LP11 to LPn (S100).

Next, the object detecting unit 12 decides whether an object is detected as a result of the object detection processing for the low resolution image data LP11 to LPn or not (S101).

If the object is detected (YES in S101), the target area determining unit 13 sets an object detection area set to the detected object as a target area for estimating a blur amount (S102). Subsequently, the blur amount estimating unit 14 estimates a blur amount in the target area for the low resolution image data LP11 to LPn (S103). Furthermore, the reference image selecting unit 15 selects a reference image from the low resolution image data LP11 to LPn based on the estimated blur amount (S104). Then, the super resolution processing unit 16 executes the super resolution processing based on the selected reference image (S105).

On the other hand, if the object is not detected (NO in S101), the target area determining unit 13 sets a whole image of the low resolution image data as a target area (S106), and thereafter, S103 to S105 are executed.

If the object is not detected for a part of the low resolution image data LP11 to LPn, the part of the low resolution images may be taken out of a selection candidate for the reference image.

Another embodiment according to the present invention will be described with reference to FIGS. 5 to 7 as follows. For convenience of the description, member having the same functions as the members described in the embodiment have the same reference numerals and explanation thereof will be omitted.

In the present embodiment, description will be given to that a result of estimation of a blur amount is subjected to weighting if a plurality of objects is detected in a low resolution image as a result of object detection processing.

First of all, a super resolution image processing apparatus 2 according to another embodiment of the present invention will be described with reference to FIG. 5. FIG. 5 is a functional block diagram showing an example of a schematic structure of the super resolution image processing apparatus 2.

Figure 5:
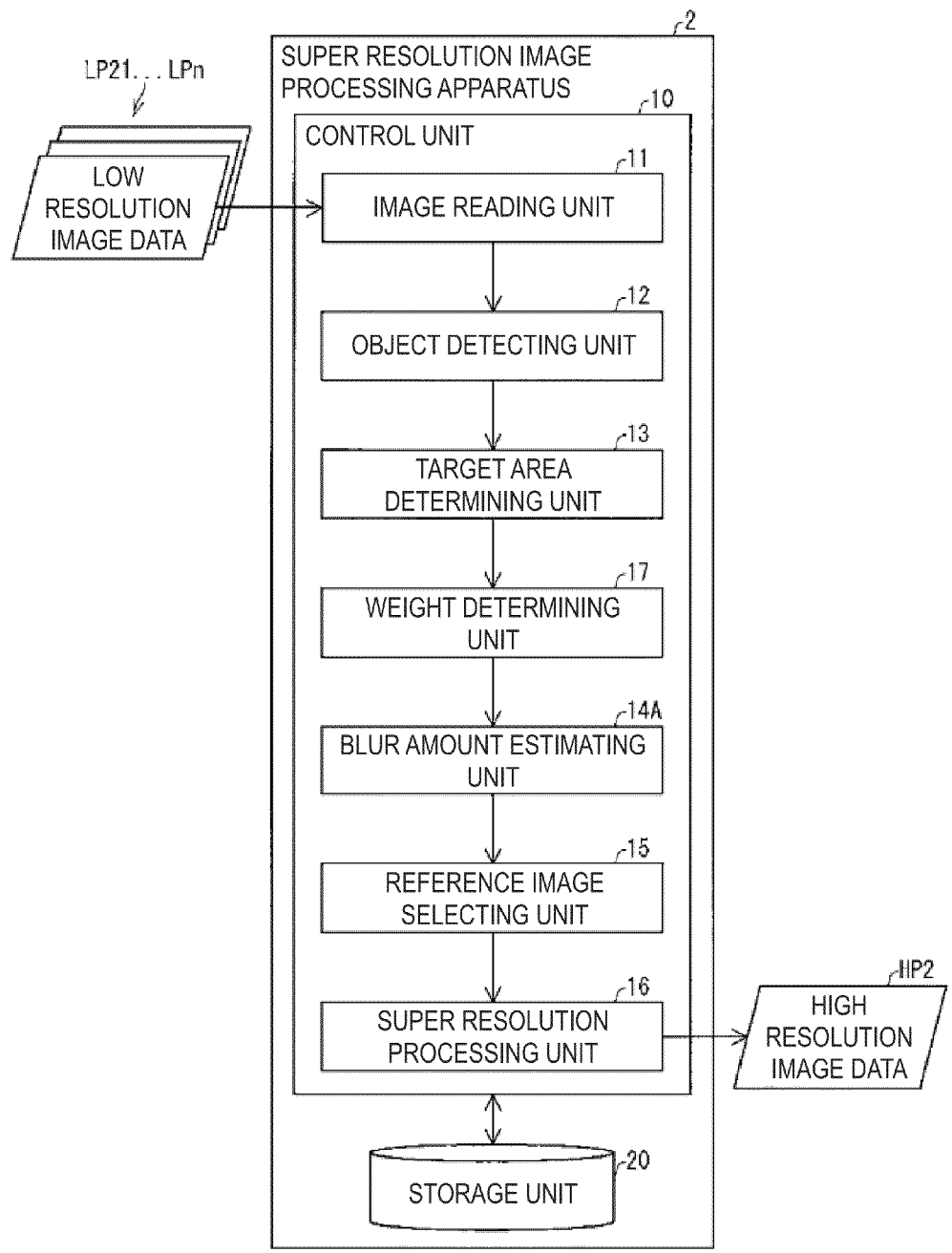
FIG. 5 is a functional block diagram showing an example of a schematic structure of a super resolution image processing apparatus according to another embodiment of the present invention.

The super resolution image processing apparatus 2 shown in FIG. 5 serves to input a plurality of low resolution image data LP21 to LPn, thereby carrying out super resolution processing to generate high resolution image data HP2 in the same manner as the super resolution image processing apparatus 1 illustrated in FIG. 1. The super resolution image processing apparatus 2 shown in FIG. 5 has a structure in which a weight determining unit 17 is added and the blur amount estimating unit 14 is changed into a blur amount estimating unit 14A in the super resolution image processing apparatus 1 illustrated in FIG. 1.

In the following, it is assumed that the object detecting unit 12 serves to detect a plurality of objects from an image indicated by the low resolution image data LP21 or the like and the target area determining unit 13 serves to set a target area for the detected objects, insofar as there is no particular remark otherwise stated. Moreover, an object detection area to be detected by the object detecting unit 12 may be integrated in accordance with a logical sum or a logical product with preceding and following frames or tracking (motion prediction).

The weight determining unit 17 and the blur amount estimating unit 14A will be described below with reference to FIG. 6.

The weight determining unit 17 determines a weight to be applied to an estimation result with respect to each of the target areas set to the detected objects. The weight determining unit 17 may carry out weighting corresponding to a type of the detected object. The type of the object indicates a kind of the detected object, for example, a (specific) human face, human body, landmark or the like.

In the case in which a specific person and a general object are detected in the low resolution image, for example, the weight determining unit 17 may cause a weight for a target area set to the specific person to be greater than a weight for a target area set to the general object.

More specific exemplification will be given with reference to FIG. 6 as follows. A person M1 and a landmark M2 are detected in images indicated by the low resolution image data LP21 and the low resolution image data LP22 shown in FIG. 6, respectively. Then, an object detection area R1 is set to the person M1 and an object detection area R2 is set to the landmark M2 by the object detecting unit 12. In this case, the weight determining unit 17 may determine a weight of 1.0 for the person M1 and may determine a weight of 0.5 for the object (the landmark M2).

Moreover, the weight determining unit 17 may carry out weighting depending on a size and a position of the detected object. The weighting can be determined depending on an importance degree or an attention degree of the detected object. The importance degree or the attention degree may be preset or calculated based on the detected object.

In addition, the weight determining unit 17 gives a notice of the determined weight to the blur amount estimating unit 14A.

The blur amount estimating unit 14A estimates a blur amount subjected to the weighting in the case in which a plurality of objects is detected in the low resolution image. Specifically, the blur amount estimating unit 14A first estimates the blur amount for target areas set to the objects which are detected in the low resolution image. Next, the blur amount estimating unit 14A applies a weight determined by the weight determining unit 17 to the estimated blur amount and adds the blur amount applying the weight, thereby calculating a total blur amount.

More specific exemplification will be given with reference to FIG. 6 as follows. Referring to the low resolution image data LP21 shown in FIG. 6, the blur amount estimating unit 14A estimates a blur amount of 10 in relation to the person M1 and estimates a blur amount of 50 in relation to the object (the landmark M2). At this time, the blur amount estimating unit 14A applies a weight of 1.0 for the person and a weight of 0.5 for the object which are determined by the weight determining unit 17 to the estimated blur amounts, respectively, and totalizes them. Referring to the low resolution image data LP21, a total blur amount calculated by the blur amount estimating unit 14A is $10 \times 1.0 + 50 \times 0.5 = 35$.

On the other hand, referring to the low resolution image data LP22, the blur amount estimating unit 14A estimates a blur amount of 50 in relation to the person M1 and estimates a blur amount of 10 in relation to the object (the landmark M2). The blur amount estimating unit 14A calculates a weighted sum of the estimated blur amounts as described above. Referring to the low resolution image data LP22, a total blur amount calculated by the blur amount estimating unit 14A is $50 \times 1.0 + 10 \times 0.5 = 55$.

Figure 6:
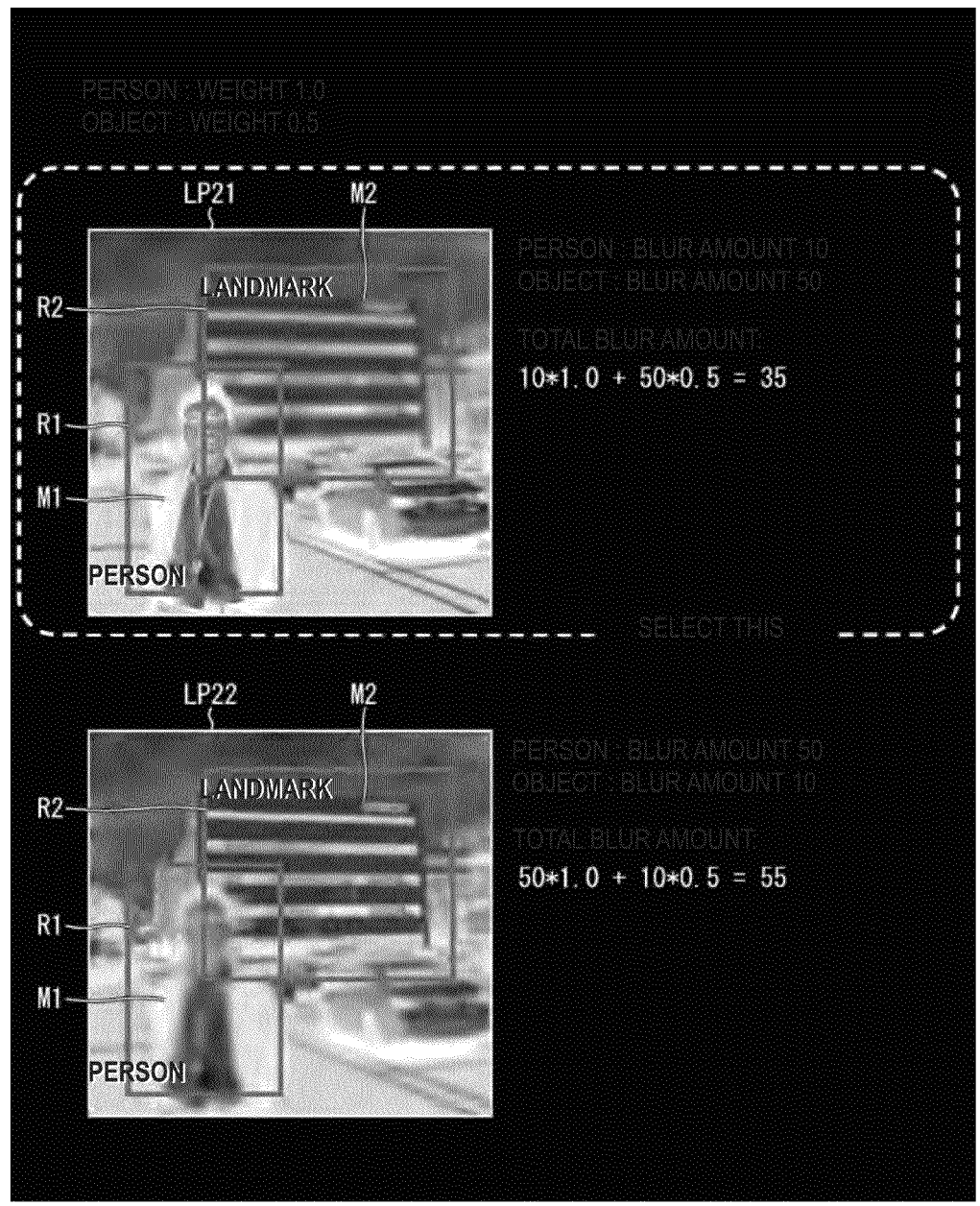
FIG. 6 is a view showing summary of reference image selection processing in the super resolution image processing apparatus.

In the example shown in FIG. 6, accordingly, the reference image selecting unit 15 selects, as a reference image, the low resolution image data LP21 having a smaller total blur amount.

(Flow of Processing in Super Resolution Image Processing Apparatus)

Next, a flow of the super resolution processing in the super resolution image processing apparatus 2 will be described with reference to FIG. 7. FIG. 7 is a flowchart illustrating the flow of the super resolution processing in the super resolution image processing apparatus 2 according to an embodiment.

Figure 7:
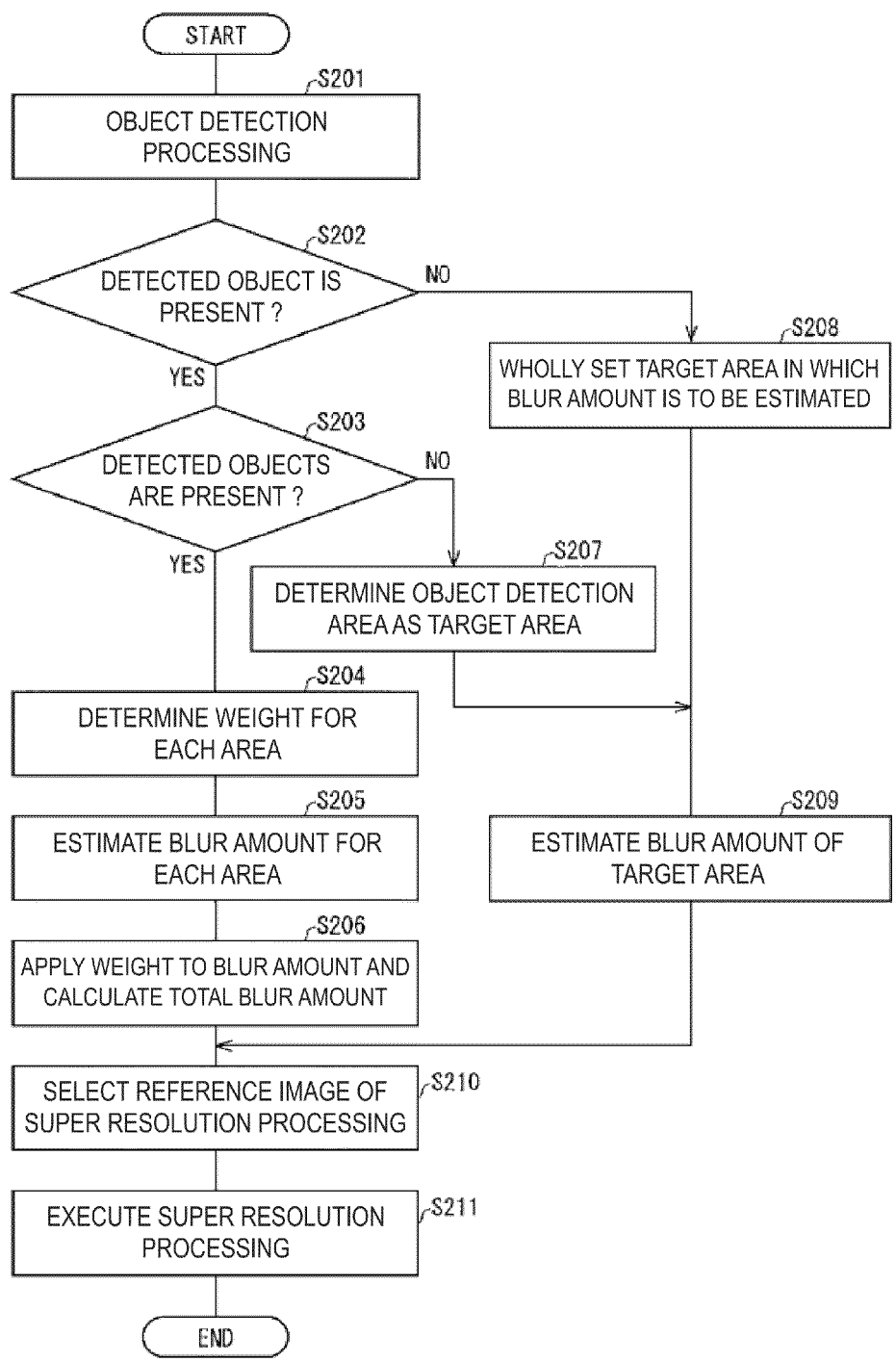
FIG. 7 is a flowchart illustrating a flow of super resolution processing of the super resolution image processing apparatus.

As shown in FIG. 7, first of all, the object detecting unit 12 executes the object detection processing for the low resolution image data LP21 to LPn (S201).

Next, the object detecting unit 12 decides whether an object is detected as a result of the object detection processing for the low resolution image data LP21 to LPn or not (S202).

If the object is detected (YES in S202), the object detecting unit 12 further decides whether the detected objects are present or not (S203).

If the objects are detected (YES in S203), the target area determining unit 13 sets target areas to the detected objects respectively and the weight determining unit 17 determines a weight for each of the set target areas (S204). Moreover, the blur amount estimating unit 14A estimates a blur amount for each of the target areas (S205) and applies a weight to the estimated blur amount, thereby calculating a total blur amount (S206).

Then, the reference image selecting unit 15 selects a reference image of super resolution processing based on the total blur amount (S210) and the super resolution processing unit 16 executes the super resolution processing based on the selected reference image (S211).

On the other hand, if the detected object is a single object (NO in S203), the target area determining unit 13 determines an object detection area related to the object as a target area for estimating a blur amount (S207). Next, the blur amount estimating unit 14A estimates a blur amount in the target area (S209). Then, the reference image selecting unit 15 determines the reference image of the super resolution processing based on the estimated blur amount (S210) and the super resolution processing unit 16 executes the super resolution processing based on the selected reference image (S211).

If the object is not detected in S202 (NO in S202), the target area determining unit 13 sets the whole image of the low resolution image data as the target area (S208) and S209 to S211 described above are thereafter executed.

Yet another embodiment according to the present invention will be described with reference to FIGS. 8 to 10 as follows. For convenience of the description, member having the same functions as the members mentioned in the embodiment have the same reference numerals and explanation thereof will be omitted.

In an embodiment, a saliency area in an image is estimated to determine a target area for estimating a blur amount.

First of all, a super resolution image processing apparatus 3 will be described with reference to FIG. 8. FIG. 8 is a functional block diagram showing an example of a schematic structure of the super resolution image processing apparatus 3.

Figure 8:
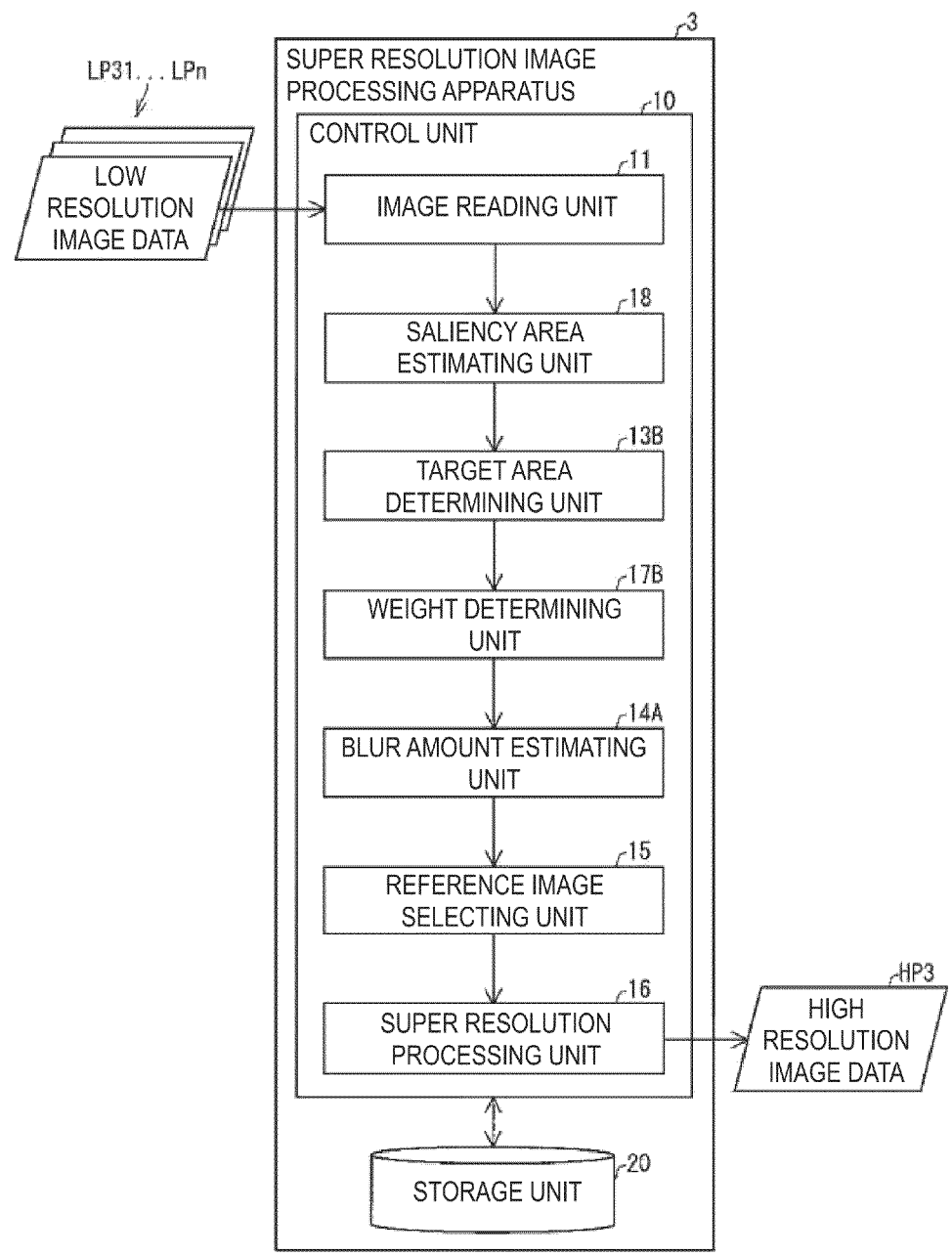
FIG. 8 is a functional block diagram showing an example of a schematic structure of a super resolution image processing apparatus according to yet another embodiment of the present invention.
Figure 9:
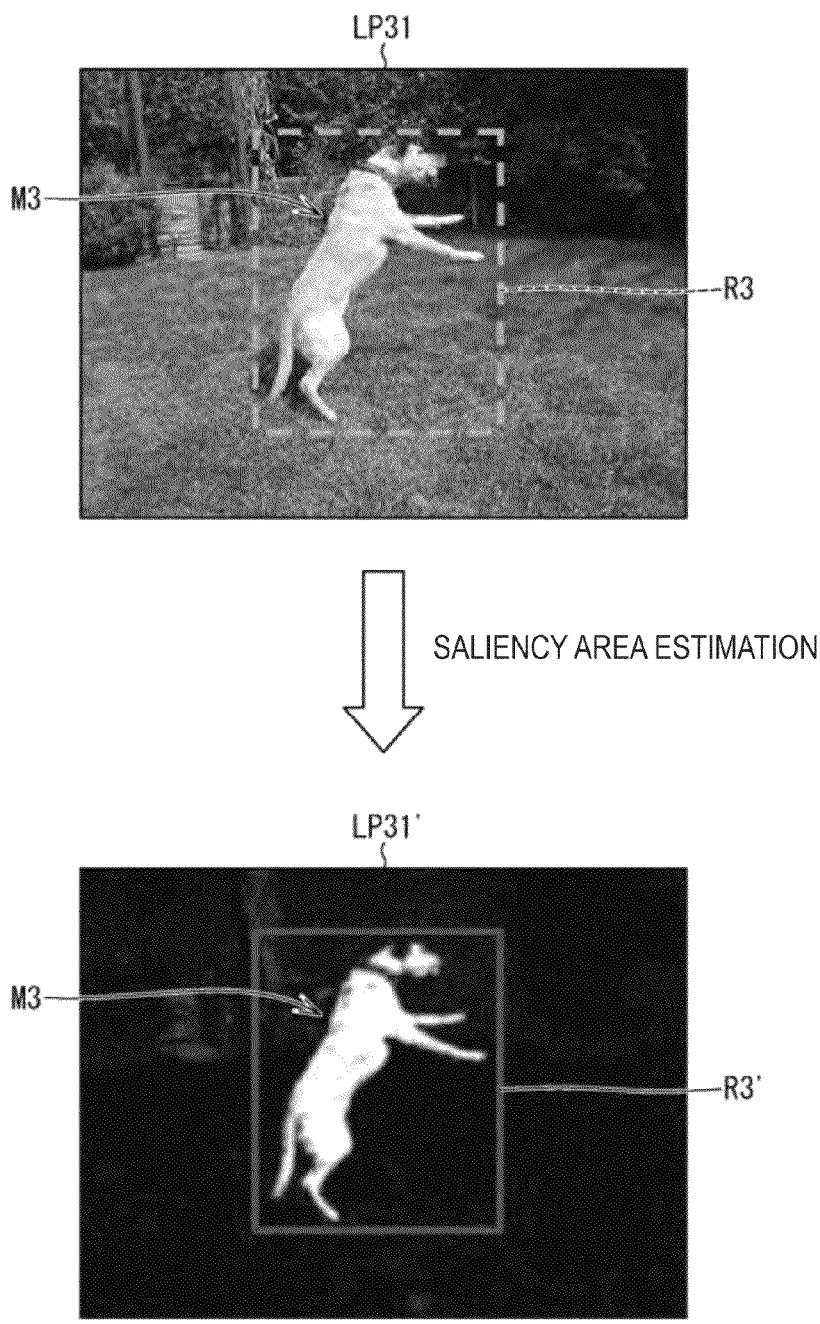
FIG. 9 is a view showing summary of reference image selection processing in the super resolution image processing apparatus.

The super resolution image processing apparatus 3 shown in FIG. 8 serves to input a plurality of low resolution image data LP31 to LPn, thereby carrying out super resolution processing to generate high resolution image data HP3 in the same manner as the super resolution image processing apparatus 2 illustrated in FIG. 5.

The super resolution image processing apparatus 3 shown in FIG. 8 has a structure in which the object detecting unit 12, the target area determining unit 13 and the weight determining unit 17 are changed into a saliency area estimating unit 18, a target area determining unit 13B and a weight determining unit 17B, respectively in the super resolution image processing apparatus 2 illustrated in FIG. 5.

The saliency area estimating unit 18, the target area determining unit 13B and the weight determining unit 17B will be described below with reference to FIG. 9.

The saliency area estimating unit 18 estimates a saliency area having a high degree of human visual attention (saliency) to images indicated by low resolution image data LP31 to LPn. Specifically, the saliency area estimating unit 18 calculates a saliency degree to be the degree of the human visual attention in relation to a low resolution image and generates a mapped saliency map image of a saliency degree.

The saliency area estimating unit 18 may calculate the saliency degree based on a contrast of an image. Next, the saliency area estimating unit 18 estimates a saliency area in the saliency map image based on the calculated saliency degree. A portion in which the saliency degree has a predetermined value or more in an image may be estimated as the saliency area and a rectangle including the portion in which the saliency degree has the predetermined value or more may be estimated as the saliency area. Moreover, the saliency area estimating unit 18 may estimate a plurality of saliency areas. Moreover, the saliency area estimated by the saliency area estimating unit 18 may be integrated in accordance with a logical sum or a logical product with preceding and following frames or tracking (motion prediction).

The saliency area estimating unit 18 will be described with reference to FIG. 9 as follows. An image indicated by the low resolution image data LP31 shown in FIG. 9 includes a dog M3. The saliency area estimating unit 18 may calculate a saliency degree in each portion of the low resolution image data LP31, thereby generating a saliency map image LP31'. It is indicated that a bright portion has a high saliency degree and a dark portion has a low saliency degree in the saliency map image LP31'.

In the saliency map image LP31', a portion corresponding to the dog M3 included in the image indicated by the low resolution image data LP31 is bright (has a high saliency degree). The saliency area estimating unit 18 sets the saliency area R3' depending on the saliency degree.

Moreover, the saliency area estimating unit 18 gives a notice of a result of the saliency area estimation processing to the target area determining unit 13B.

The target area determining unit 13B determines an area in which blur amount estimation processing is to be executed based on the result of the saliency area estimation processing for each of the low resolution image data LP31 to LPn.

The target area determining unit 13B illustratively determines a portion corresponding to the saliency area estimated in the saliency map image LP31' in the image indicated by the low resolution image data LP31 as the area in which the blur amount estimation processing is to be executed (which will be hereinafter referred to as a target area).

Moreover, the target area determining unit 13 may set a plurality of target areas depending on the result of the saliency area estimation.

The target area determining unit 13B will be described with reference to FIG. 9 as follows. As shown in FIG. 9, the target area determining unit 13B sets, as a target area R3, a portion corresponding to the saliency area R3' estimated in the saliency map image LP31' in the image indicated by the low resolution image data LP31.

The target area determining unit 13B gives a notice of the determined target area to the weight determining unit 17B.

The weight determining unit 17B determines a weight to be applied to the estimation result of the blur amount for each of the estimated saliency areas (furthermore, the target areas corresponding to the saliency areas). The weight determining unit 17B may carry out weighting depending on the saliency degree of each of the saliency areas. The weight determining unit 17B may set uniformly the weight to be applied to each target area (in other words, the weighting may be omitted). Moreover, it is also possible to employ a structure in which the weight determining unit 17B is omitted.

(Flow of Processing in Super Resolution Image Processing Apparatus)

Next, a flow of the super resolution processing in the super resolution image processing apparatus 3 will be described with reference to FIG. 10. FIG. 10 is a flowchart illustrating the flow of the super resolution processing of the super resolution image processing apparatus 3 according to an embodiment.

Figure 10:
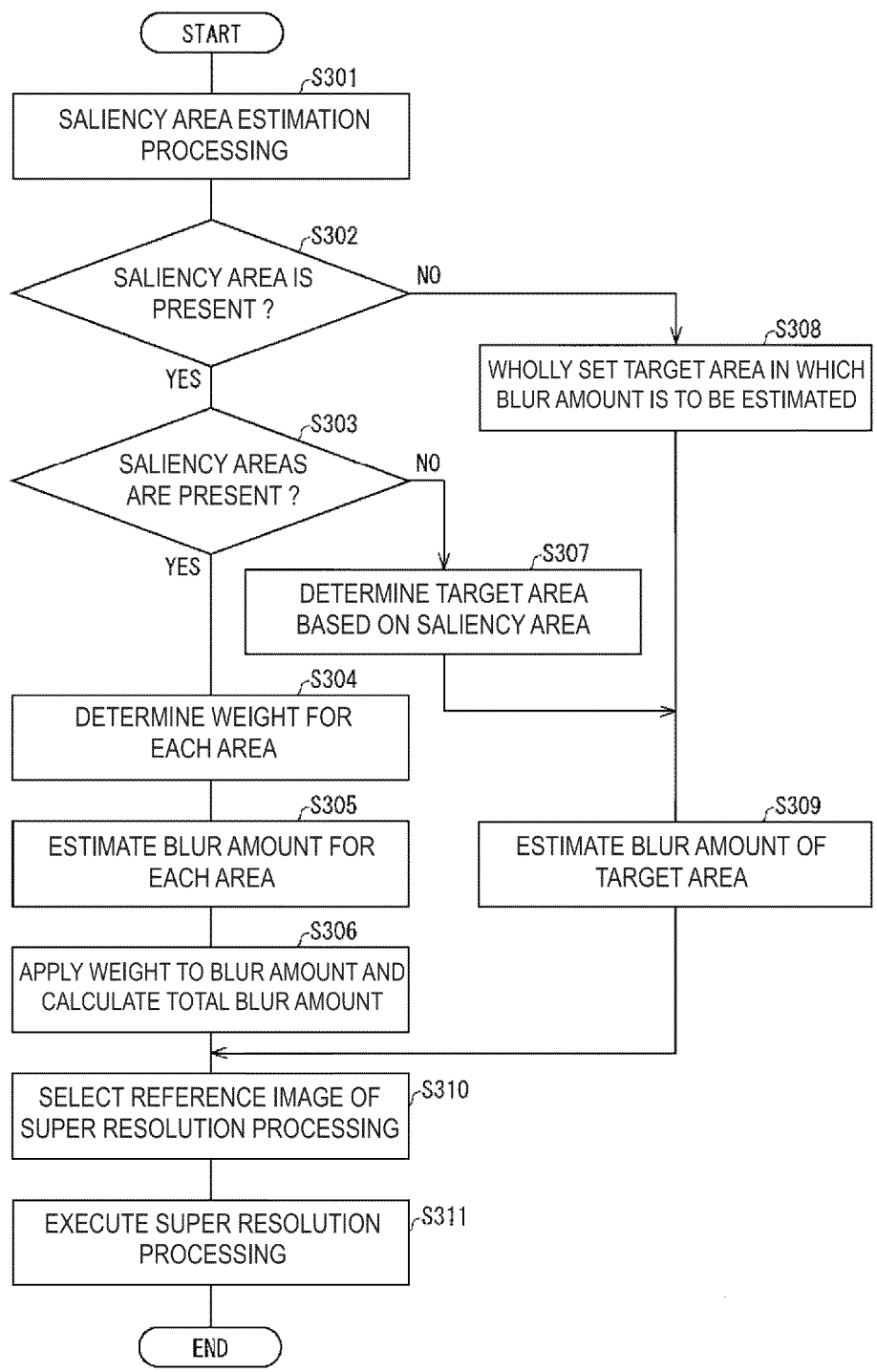
FIG. 10 is a flowchart illustrating a flow of super resolution processing of the super resolution image processing apparatus.

As shown in FIG. 10, first of all, the saliency area estimating unit 18 executes the saliency area estimation processing for the low resolution image data LP31 to LPn (S301).

Next, the saliency area estimating unit 18 decides whether a saliency area is present as a result of the saliency area estimation processing executed for the low resolution image data LP31 to LPn or not (S302).

If the saliency areas is present (YES in S302), the saliency area estimating unit 18 further decides whether a plurality of saliency areas are present or not (S303).

If the saliency areas are present (YES in S303), the target area determining unit 13B sets target areas to the saliency areas respectively and the weight determining unit 17B determines a weight for each of the set target areas (S304). Moreover, the blur amount estimating unit 14A estimates a blur amount for each of the target areas (S305) and applies a weight to the estimated blur amount, thereby calculating a total blur amount (S306).

Then, the reference image selecting unit 15 selects a reference image of super resolution processing based on the total blur amount (S310) and the super resolution processing unit 16 executes the super resolution processing based on the selected reference image (S311).

On the other hand, if the estimated saliency area is single (NO in S303), the target area determining unit 13B determines a target area for estimating a blur amount based on the saliency area (S307). Next, the blur amount estimating unit 14B estimates a blur amount in the target area (S309). Then, the reference image selecting unit 15 selects the reference image of the super resolution processing based on the estimated blur amount (S310) and the super resolution processing unit 16 executes the super resolution processing based on the selected reference image (S311).

If the saliency area is not present in S302 (NO in S302), the target area determining unit 13B sets the whole image of the low resolution image data as the target area (S308) and S309 to S311 described above are thereafter executed.

A further embodiment according to the present invention will be described with reference to FIGS. 11 to 13 as follows. For convenience of the description, member having the same functions as the members mentioned in the embodiment have the same reference numerals and explanation thereof will be omitted.

In the present embodiment, description will be given to that both object detection and saliency area estimation are carried out to perform weighting based on overlap ranges of respective results.

First of all, a super resolution image processing apparatus 4 according to the further embodiment of the present invention will be described with reference to FIG. 11. FIG. 11 is a functional block diagram showing an example of a schematic structure of the super resolution image processing apparatus 4.

Figure 11:
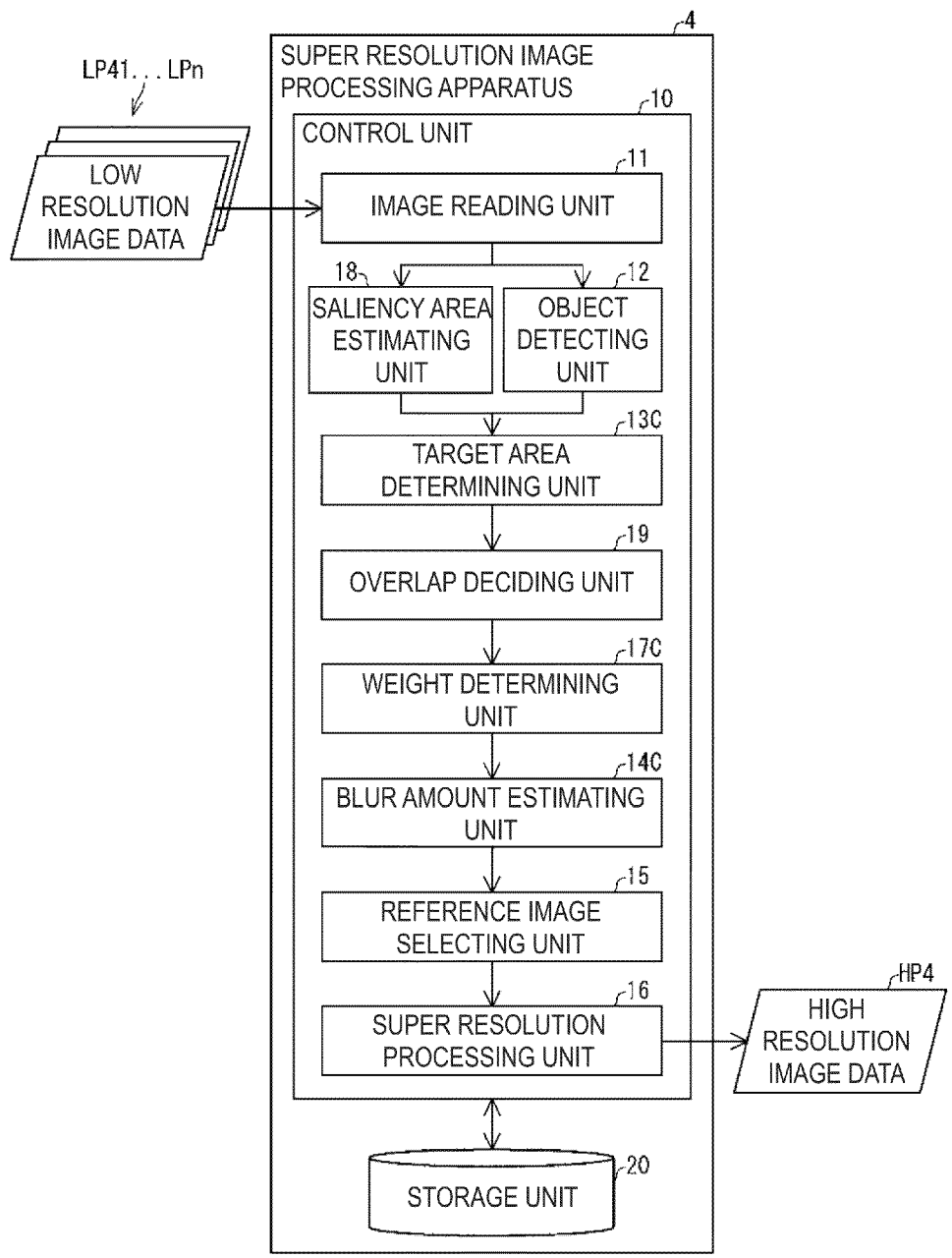
FIG. 11 is a functional block diagram showing an example of a schematic structure of a super resolution image processing apparatus according to a further embodiment of the present invention.

The super resolution image processing apparatus 4 shown in FIG. 11 serves to input a plurality of low resolution image data LP41 to LPn, thereby carrying out super resolution processing to generate high resolution image data HP4 in the same manner as the super resolution image processing apparatus 1 illustrated in FIG. 1 and the super resolution image processing apparatus 3 illustrated in FIG. 8.

The super resolution image processing apparatus 4 shown in FIG. 11 schematically includes both the object detecting unit 12 provided in the super resolution image processing apparatus 1 and the saliency area estimating unit 18 provided in the super resolution image processing apparatus 3.

More specifically, a control unit 10 of the super resolution image processing apparatus 4 includes an image reading unit 11, an object detecting unit 12, a saliency area estimating unit 18, a target area determining unit 13C, an overlap deciding unit 19, a weight determining unit 17C, a blur amount estimating unit 14C, a reference image selecting unit 15 and a super resolution processing unit 16.

Since the image reading unit 11, the object detecting unit 12, the saliency area estimating unit 18, the reference image selecting unit 15 and the super resolution processing unit 16 have already been described, explanation thereof will be omitted. It is assumed that the object detecting unit 12 gives a notice of a result of object detection processing to the target area determining unit 13C. Moreover, it is assumed that the saliency area estimating unit 18 gives a notice of a result of saliency area estimation processing to the target area determining unit 13C.

The target area determining unit 13C, the overlap deciding unit 19, the weight determining unit 17C and the blur amount estimating unit 14C will be described below.

The target area determining unit 13C sets a first target area based on the result of the object detection processing for each of low resolution image data LP41 to LPn and sets a second target area based on the result of the saliency area estimation processing. In the following explanation, it is assumed that at least either of the first target areas and the second target areas is set. Moreover, the second target area is a portion corresponding to a saliency area set in a saliency map image in the low resolution image. The target area determining unit 13C gives a notice of the determined first and second target areas to the overlap deciding unit 19.

The overlap deciding unit 19 decides whether the first target area and the second target area overlap with each other. The overlap deciding unit 19 may decide an overlap degree and range of the first target area and the second target area.

The weight determining unit 17C determines a weight to be applied to the first target area and the second target area depending on whether the first target area and the second target area overlap with each other or not. The weight determining unit 17C may determine the weight depending on the overlap degree of the first target area and the second target area.

Figure 12A:
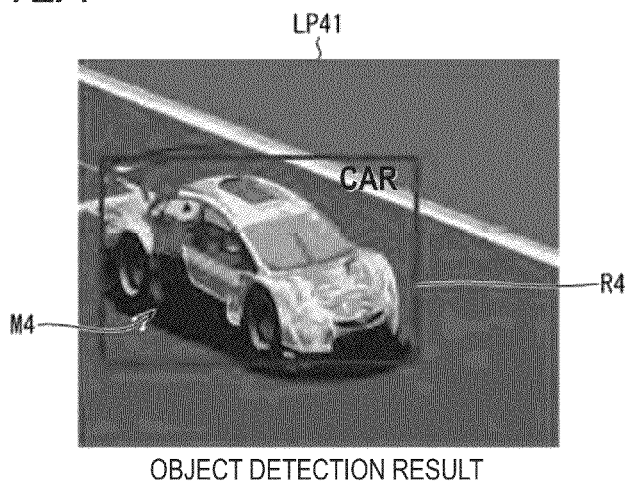
FIGS. 12A and 12B are views showing summary of reference image selection processing in the super resolution image processing apparatus.
Figure 12B:
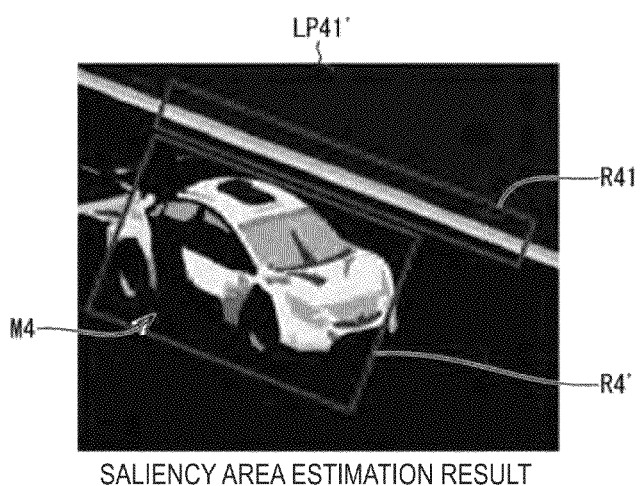

Description will be given with reference to FIGS. 12A and 12B as follows. FIGS. 12A and 12B schematically show low resolution image data and a saliency map image to be generated from the low resolution image data. An image indicated by low resolution image data LP41 shown in FIG. 12A includes a car M4 traveling in a circuit. In the image, an object detection area R4 is set to the car M4 as a result of object detection through the object detecting unit 12.

As shown in FIG. 12B, the saliency area estimating unit 18 generates a saliency map image LP41' based on the low resolution image data LP41. Referring to the saliency map image LP41', moreover, a high saliency degree is detected in the vicinity of a white line in a boundary between the car M4 and a circuit course as a result of the saliency area estimation processing. The saliency area estimating unit 18 sets a saliency area R4' to the car M4 and sets a saliency area R41 to the white line.

The overlap deciding unit 19 decides whether the first target area (the object detection area) and the second target area (an area corresponding to the saliency area in a low resolution image) overlap with each other or not. In examples shown in FIGS. 12A and 12B, an object detection area R4 and an area corresponding to the saliency area R4' overlap with each other. On the other hand, referring to the saliency area R41', a corresponding object detection area is not present. Accordingly, the weight determining unit 17C causes a higher weight than that of the white line to be applied to the car M4.

The blur amount estimating unit 14C estimates a blur amount for the first target area or the second target area by using the weight determined by the weight determining unit 17C. The present invention is not restricted thereto but the blur amount estimating unit 14C may determine an area in which a blur amount is to be estimated based on the first target area or the second target area. Specifically, the blur amount estimating unit 14C may execute area calculation such as a sum or a product for the first target area and the second target area in order to determine the area in which the blur amount is to be estimated. For example, the blur amount estimating unit 14C may set an overlap area of the first target area and the second target area as the area in which the blur amount is to be estimated.

(Flow of Processing in Super Resolution Image Processing Apparatus)

Next, a flow of the super resolution processing in the super resolution image processing apparatus 4 will be described with reference to FIG. 13. FIG. 13 is a flowchart illustrating the flow of the super resolution processing of the super resolution image processing apparatus 4 according to an embodiment.

Figure 13:
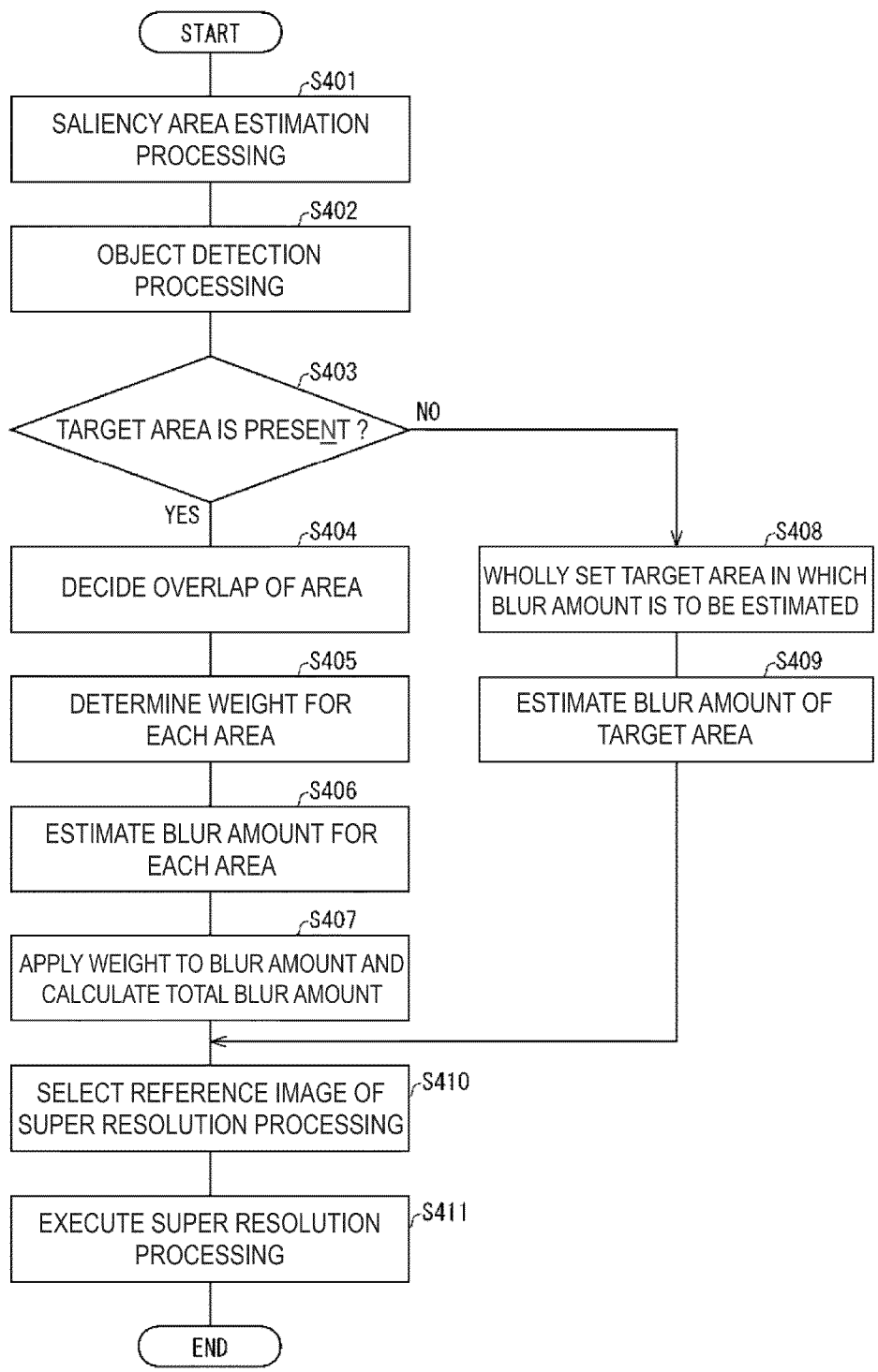
FIG. 13 is a flowchart illustrating a flow of super resolution processing of the super resolution image processing apparatus.

As shown in FIG. 13, first of all, the saliency area estimating unit 18 executes the saliency area estimation processing for the low resolution image data LP41 to LPn (S401).

Next, the object detecting unit 12 executes the object detection processing for the low resolution image data LP41 to LPn (S402).

Subsequently, the target area determining unit 13C sets the first target area based on the result of the object detection processing and sets the second target area based on the result of the saliency area estimation processing for each of the low resolution image data LP41 to LPn. The target area determining unit 13C decides whether the target areas are present or not (S403). Specifically, the target area determining unit 13C decides whether the first target area is present and the second target area is present.

If the first target area and the second target area are present (YES in S403), the overlap deciding unit 19 decides the overlap of the first target area and the second target area (S404). Next, the weight determining unit 17C determines a weight to be applied to each of the target areas depending on the decision of the overlap (S406). Moreover, the blur amount estimating unit 14C estimates a blur amount for each target area by using the weight determined by the weight determining unit 17C (S406) and applies the weight to the estimated blur amount, thereby calculating a total blur amount (S407).

Then, the reference image selecting unit 15 selects a reference image for the super resolution processing based on the total blur amount (S410) and the super resolution processing unit 16 executes the super resolution processing based on the selected reference image (S411).

On the other hand, if at least one of the first target area and the second target area is not present (NO in S403), the target area determining unit 13C determines the whole image as a target area for estimating a blur amount (S408). In S408, if one of the first target area and the second target area is present, the target area determining unit 13C may determine, as the target area, either of the first target area and the second target area, which is present.

Next, the blur amount estimating unit 14C estimates the blur amount in the target area (S409). Thereafter, the reference image selecting unit 15 selects a reference image for the super resolution processing based on the estimated blur amount (S410) and the super resolution processing unit 16 executes the super resolution processing based on the selected reference image (S411).

[Variant]

(1) Referring to Image Index Representing Property of Image

Although the description has been given to the structure in which the blur amount estimating units 14, 14A and 14C estimate the blur amount as an example, the present invention is not restricted to the structure. In the super resolution image processing apparatuses 1, 2, 3 and 4, it is also possible to estimate an image index representing a property of an image. As the image index representing the property of the image, for example, it is possible to employ an index representing a subjective characteristic of an image. More specifically, the image index representing the property of the image includes "blur", "noise", "overexposure" and "underexposure" in addition to "blur amount", for example. Moreover, the reference image selecting unit 15 may select the reference image based on the estimated image index.

(2) Referring to Technique for Integrating Object Detection Area

Explanation will be given to a technique for integrating an object detection area between the low resolution images in the super resolution image processing apparatuses 1, 2, 3 and 4 described above.

For convenience of the explanation, the super resolution image processing apparatuses 1 and 2 will be described in order. In some cases, the object detection result is varied between the frames due to a fluctuation in image quality between the frames. In this case, it is also possible to match the object detection results between the frames as described below.

Figure 15:
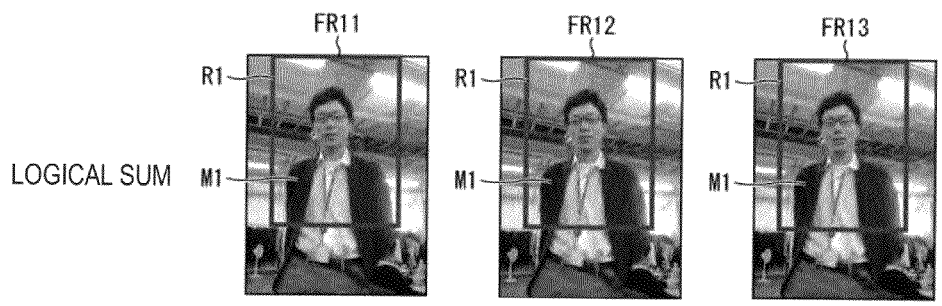
FIG. 15 is a view showing the method of matching object detection results between frames.
Figure 16:
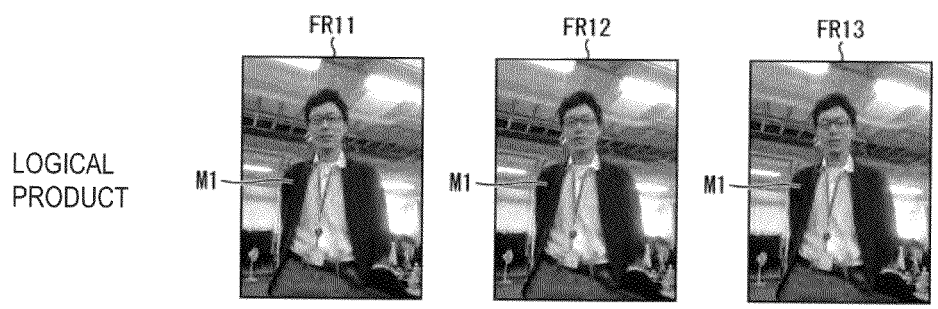
FIG. 16 is a view showing the method of matching object detection results between frames.

A technique for matching the object detection areas in the low resolution images in the super resolution image processing apparatus 1 will be described with reference to FIGS. 14 to 16.

Figure 14:
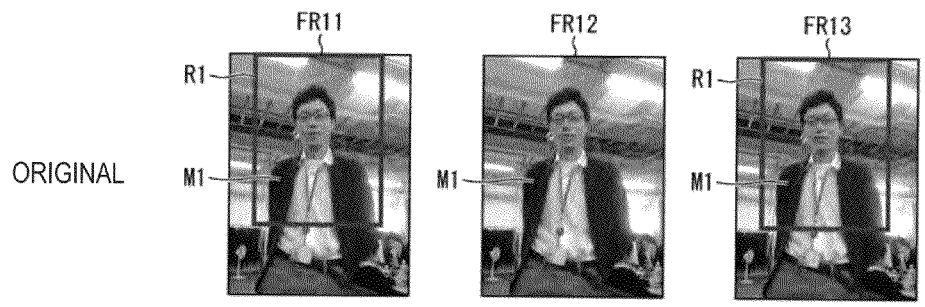
FIG. 14 is a view showing a method of matching object detection results between frames.

First of all, description will be given to the case in which the object detection results are not matched between the respective frames as shown in FIG. 14. FIG. 14 shows an example of frames FR11, FR12 and FR13 of the low resolution images subjected to the object detection processing in the super resolution image processing apparatus 1.

The object detecting unit 12 detects a person M1 in the frame FR11 and the frame FR13 and sets an object detection area R1 in the respective frames. However, an object is not detected due to a fluctuation in image quality in the frame FR12.

In the case shown in FIG. 14, the object detecting unit 12 may take a logical sum in relation to the object detection area R1 among the frames FR11, FR12 and FR13, thereby complementing for the object detection result. In other words, the object detecting unit 12 can complement for the object detection area R1 in the frame FR12 as shown in FIG. 15 by taking the logical sum. Even if detection leakage of an object is caused by the fluctuation in the image quality in any of the frames, consequently, it is possible to match the object detection areas between the respective frames by carrying out complementation through the other frames.

When complementing for the object detection area in the frame FR12 to be a complementation target, the object detecting unit 12 may use a position of the object detection area in any of the other frames or use an average position of the object detection areas set in the other frames. This is the same in the following explanation.

In the case shown in FIG. 14, moreover, the object detecting unit 12 may take a logical product in relation to the object detection area R1 among the frames FR11, FR12 and FR13. In other words, as shown in FIG. 16, the object detecting unit 12 may take the logical product, thereby removing the object detection area R1 from the frames FR11 and FR13. As shown in FIG. 16, consequently, it is possible to match the object detection areas among the frames FR11, FR12 and FR13.

According to the structure, for example, it is possible to remove erroneous detection in any of the frames if occurs.

Moreover, it is also possible to determine whether a logical sum is taken or a logical product is taken depending on a matching degree of the object detection area. In the case in which a plurality of objects is detected, the determination may be carried out every object.

In the case in which a certain object is detected in many frames but is not detected in a part of the frames, specifically, the object detecting unit 12 may determine to take the logical sum. The reason is that the detection leakage of the object might be caused in the part of the frames. Consequently, it is possible to complement for the detection leakage, thereby matching the object detection areas between the respective frames.

On the other hand, in the case in which a certain object is not detected in many frames but is detected in a part of the frames, the object detecting unit 12 may determine to take the logical product. That reason is that the object might be erroneously detected in the part of the frames. Consequently, it is possible to remove the erroneous detection, thereby matching the object detection areas between the respective frames. This is the same in the following explanation.

Next, a technique for matching object detection areas between low resolution images in the super resolution image processing apparatus 2 will be described with reference to FIGS. 17 to 20.

Figure 18:
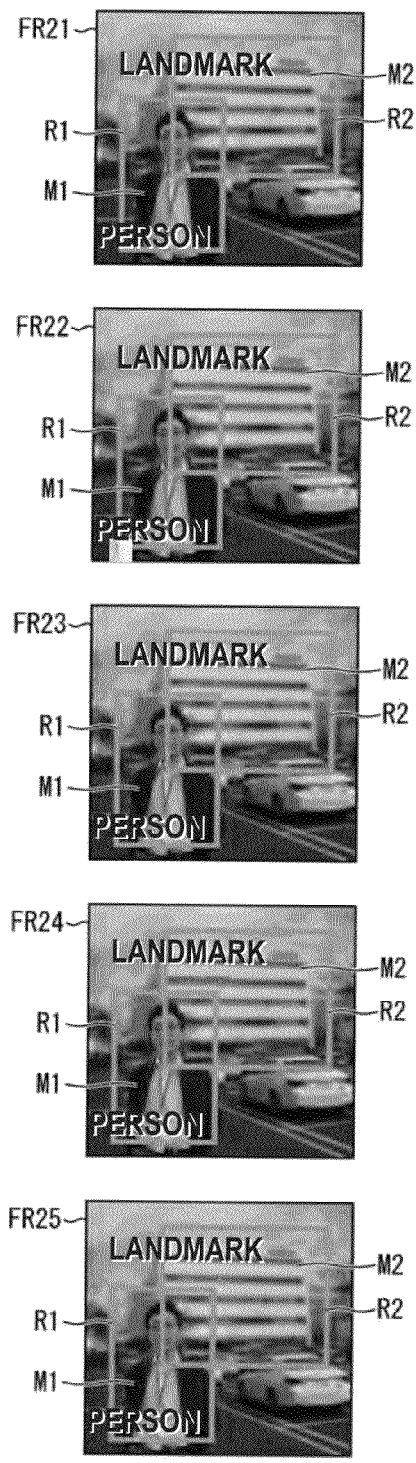
FIG. 18 is a view showing the method of matching object detection results between frames.

First of all, a technique for carrying out the matching based on a logical sum will be described with reference to FIGS. 17 and 18. FIG. 17 shows an example of frames FR21 to FR25 of the low resolution images subjected to the object detection processing in the super resolution image processing apparatus 2. Each of the low resolution images includes a person M1 and a landmark M2.

The object detecting unit 12 detects the person M1 and sets an object detection area R1 in the frames other than the frame FR24. Moreover, the object detecting unit 12 detects the landmark M2 and sets an object detection area R2 in the frames other than the frame FR23.

In the case shown in FIG. 17, the object detecting unit 12 may take a logical sum in relation to the object detection areas R1 and R2 among the frames FR21 to FR25, thereby complementing for an object detection result. In other words, the object detecting unit 12 can complement for the object detection area R1 in the frame FR24 and can complement for the object detection area R2 in the frame FR23 as shown in FIG. 18 by taking the logical sum. Consequently, it is possible to match the object detection areas among the frames FR21 to FR25.

Figure 19:
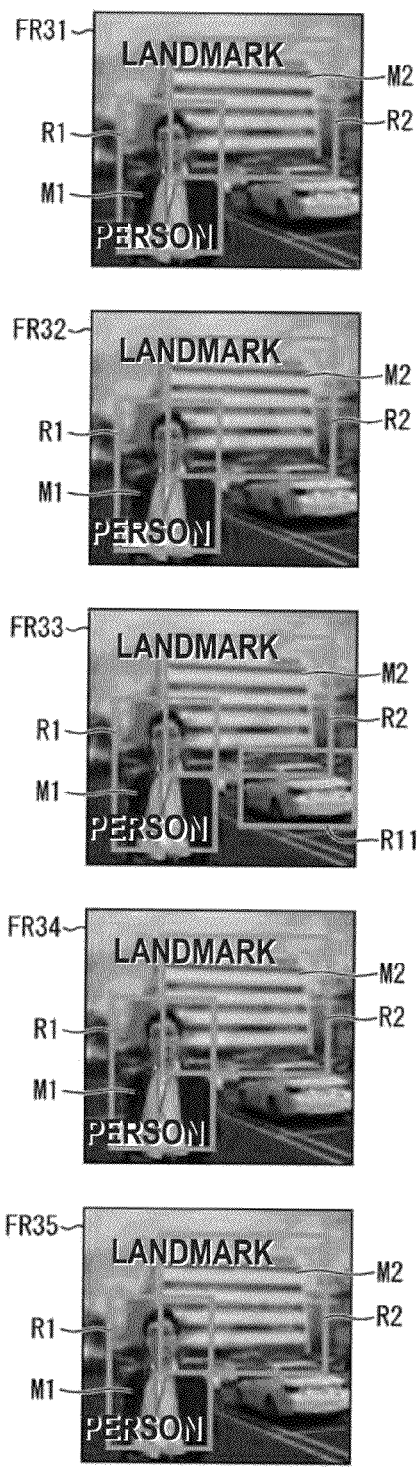
FIG. 19 is a view showing the method of matching object detection results between frames.
Figure 20:
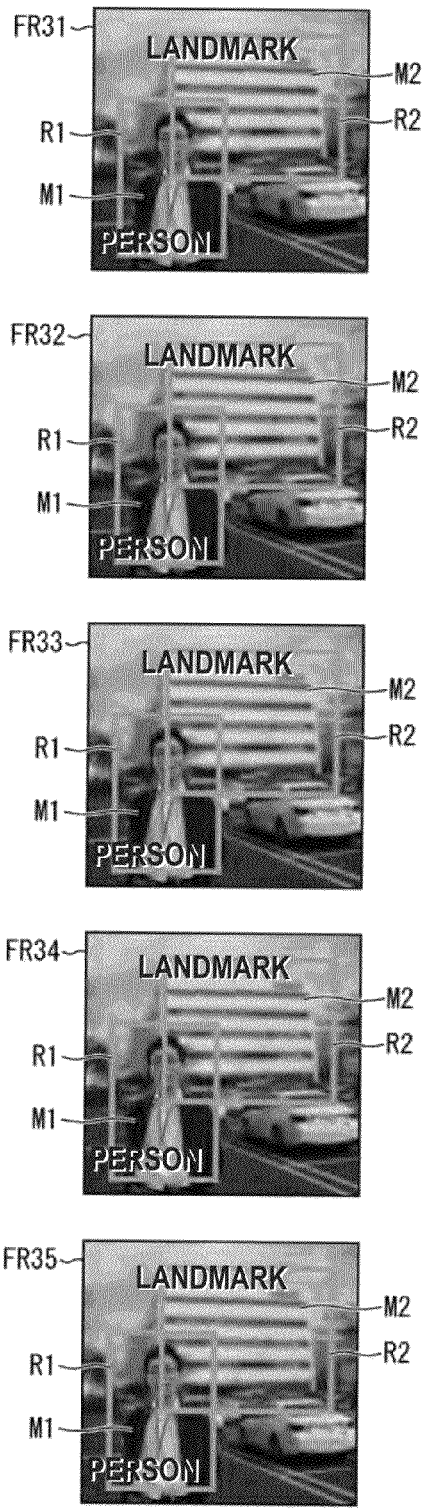
FIG. 20 is a view showing the method of matching object detection results between frames.
Figure 21A:
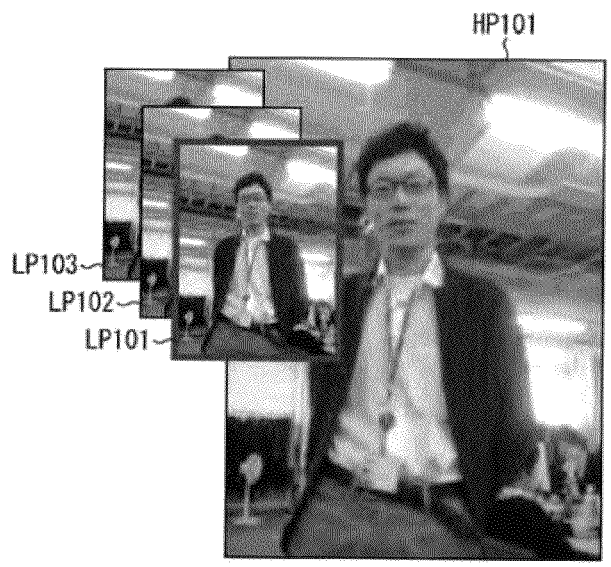
FIGS. 21A and 21B are views showing super resolution image processing according to the related art.
Figure 21B:
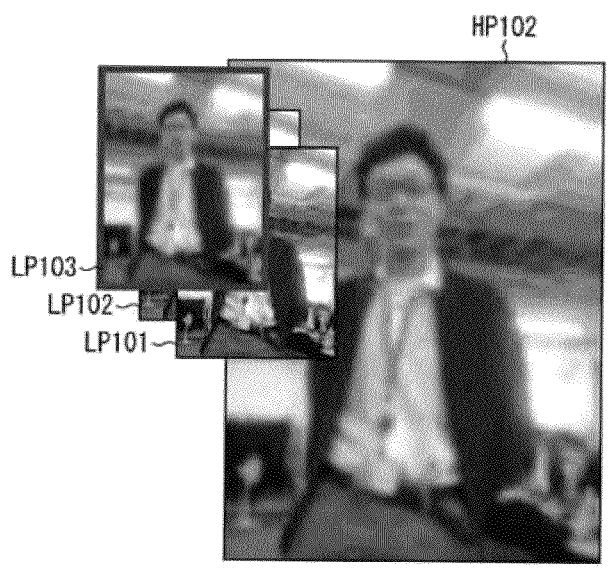
Figure 22A:
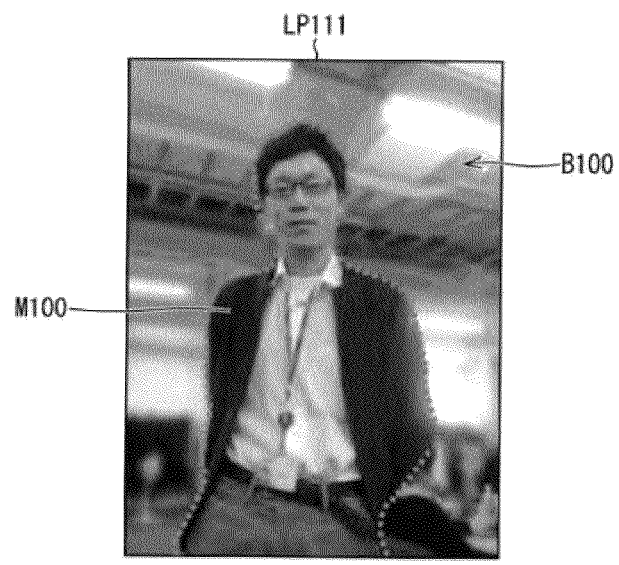
FIGS. 22A and 22B are views showing the super resolution image processing according to the related art.
Figure 22B:
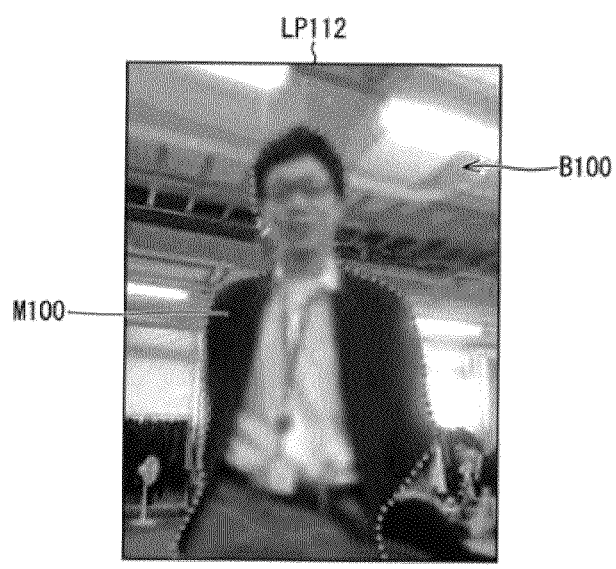

Subsequently, a technique for carrying out the matching based on a logical product will be described with reference to FIGS. 19 and 20. FIG. 19 shows an example of frames FR31 to FR35 of the low resolution images subjected to the object detection processing in the super resolution image processing apparatus 2. Each of the low resolution images includes the person M1 and the landmark M2.

The object detecting unit 12 detects the person M1 and the landmark M2 in all of the frames FR31 to FR35 and sets the object detection areas R1 and R2 in relation to the person M1 and the landmark M2, respectively.

Moreover, the object detecting unit 12 sets an unknown object detection area R11 to an unknown object in the frame FR33 due to a fluctuation in image quality or the like.

In the case shown in FIG. 19, the object detecting unit 12 may take a logical product in relation to the object detection areas R1, R2 and R11 among the frames FR31 to FR35, thereby removing an object detection result which is thought to be unnecessary. In other words, the object detecting unit 12 can remove the unknown object detection area R11 from the frame FR33 as shown in FIG. 20 by taking the logical product. Consequently, it is possible to match the object detection areas among the frames FR31 to FR35.

As described above, the image processing apparatus 1 serves to generate the high resolution image data HP1 by using the images indicated by the low resolution image data LP11 to LPn and has such a structure as to include the target area determining unit (the target area setting unit) 13 configured to set the target area which is the area to be noted in each of the images indicated by the low resolution image data LP11 to LPn, the blur amount estimating unit (the image index estimating unit) 14 configured to estimate the blur amount in the target area set to each of the images indicated by the low resolution image data LP11 to LPn, and the reference image selecting unit (the selecting unit) 15 configured to select the low resolution image to be a reference for generating the high resolution image data HP1 by using the images indicated by the low resolution image data LP11 to LPn depending on the estimated blur amount.

According to any of the above embodiments, the image processing apparatus generates a high resolution image from a low resolution image by so-called super resolution processing for an image. The image processing apparatus refers to a plurality of low resolution images having a plurality of positional shifts, thereby carrying out the super resolution processing for the low resolution image based on a positional shift amount between the low resolution images and image data on the low resolution images to generate a single high resolution image.

According to the structure, first of all, a target area to be noted is set in each of the low resolution images. The target area represents an area including an object to be detected by image analysis, a pattern to be visually noted and the like in the image. More specifically, an area in which an object is detected by object detection processing can be set as a target area or a target area can be set by estimation of a saliency area.

A plurality of target areas may be set. For example, in the case in which a plurality of objects is detected by the image analysis, the target areas may be set.

The super resolution processing is performed on the basis of a reference image selected from the low resolution images. For example, the positional shift amount is calculated on the basis of the reference image in the super resolution processing.

According to the structure, the low resolution image to be the reference for generating the high resolution image is selected from the low resolution images depending on the image index estimated in the target area. For example, the image index representing a property of an image includes "blur amount", "blur", "noise", "overexposure" and "underexposure". In the image processing apparatus according to the present invention, the image index is preferably the blur amount. The blur amount represents an index indicative of a size of the blur included in the image.

Therefore, it is possible to select the reference image in the execution of the super resolution processing from the low resolution images depending on the image index estimated in the target area. For example, it is preferable to select, as the reference image, the low resolution image having an excellent image index estimated in the target area (for instance, a small blur amount).

Consequently, it is possible to produce an effect that a high resolution image having a clearer target area can be generated.

The image processing apparatus according to each of the embodiments according to the present invention may be implemented by a computer. In this case, a control program of the image processing apparatus which operates the computer as each unit provided in the image processing apparatus, thereby implementing the image processing apparatus through the computer, and a computer readable recording medium recording the control program also belong to the category of the present invention.

It is preferable that the image processing apparatus according to the present invention should further include a weight setting unit configured to set a weight to a plurality of target areas set in the low resolution image by the target area setting unit if the target areas are set, and the image index estimating unit should estimate the image index of the low resolution image based on the set weight.

According to the structure, in the case in which a plurality of target areas is set in the low resolution image, the weight is set to the respective areas.

Referring to the setting of the weight, in the case in which the target area is detected by the object detection, for example, the weight may be set depending on the detected object. Referring to the setting of the weight, in the case in which the target area is set based on the estimation of the saliency area, for example, a weight depending on a saliency degree may be set.

According to the structure, the image index corresponding to the weighting for each target area is estimated in each of the low resolution images.

Consequently, it is possible to select the reference image from the low resolution images based on the image index estimated depending on the weighting for each target area in each of the low resolution images.

In the image processing apparatus according to the present invention, it is preferable that the target area setting unit should perform object detection in each of the low resolution images and should set the target area based on a result of the object detection.

According to the structure, the target area is set based on the result of the object detection. The object detection includes detection of a human face, detection of a person, detection of a structure containing a landmark or a pattern, and the like. There is a high possibility that an area in which an object is detected might be an area to be noted. Therefore, the area can be set as the target area.

In the image processing apparatus according to the present invention, it is preferable that the target area setting unit should estimate a saliency area in each of the low resolution images and should set a target area based on the estimated saliency area.

According to the structure, the target area is set based on the estimation of the saliency area. For example, there is a high possibility that an area having a high saliency degree might be an area to be noted. Therefore, the area can be set as the target area.

In the image processing apparatus according to the present invention, it is preferable that the target area setting unit should perform object detection and estimation of a saliency area in the respective low resolution images and should set target areas depending on results of the object detection and the estimation of the saliency area, and the weight setting unit should set a weight depending on the target area set by the object detection and the target area set by the estimation of the saliency area.

In image processing apparatus according to the present invention, it is preferable that the target area setting unit should modify the target area set in each of the low resolution images based on the set target area.

According to the structure, the set target area is modified. Also in the case in which the target area is not set in the same manner between the low resolution images, therefore, the target areas can be aligned between the low resolution images.

In the image processing apparatus according the present invention, it is preferable that the target area setting unit should take a logical sum for the target area set in each of the low resolution images between the low resolution images, thereby modifying the set target area.

According to the structure, it is possible to complement for the target area between the low resolution images. Specifically, it is possible to complement for the target area which is not set in a part (a small number) of the low resolution images based on the target area set in the other (a large number of) low resolution images. Consequently, it is possible to produce an effect that setting leakage of the target area can be prevented.

In the image processing apparatus according to the present invention, it is preferable that the target area setting unit should take a logical product for the target area set in each of the low resolution images between the low resolution images, thereby modifying the set target area.

According to the structure, it is possible to remove erroneous detection of the target area between the low resolution images. In the case in which there is a target area which is set in a part (a small number) of the low resolution images and is not set in the other (a large number of) low resolution images, specifically, it is possible to remove a target area which is set in only the part (small number) of low resolution images.

The image processing apparatus according to the present invention includes a target area setting unit configured to set a target area which is an area to be noted in each of low resolution images, an image index estimating unit configured to estimate an image index representing a property of an image in the target area set in each of the low resolution images, and a selecting unit configured to select any of the low resolution images which is a reference for generating a high resolution image from the low resolution images depending on the estimated image index.

In an embodiment, there is a method of controlling an image processing apparatus. The method includes a target area setting step of setting a target area which is an area to be noted in each of low resolution images, an image index estimating step of estimating an image index representing a property of an image in the target area set in each of the low resolution images, and a selecting step of selecting any of the low resolution images which is a reference for generating a high resolution image from the low resolution images depending on the estimated image index.

The image processing program according to the present invention causes a computer to execute processing of a target area setting step of setting a target area which is an area to be noted in each of low resolution images, an image index estimating step of estimating an image index representing a property of an image in the target area set in each of the low resolution images, and a selecting step of selecting any of the low resolution images which is a reference for generating a high resolution image from the low resolution images depending on the estimated image index.

Accordingly, it is possible to generate a high resolution image having a clearer target area.

[Implementation Through Software]

The control block (the control unit 10) of the super resolution image processing apparatuses 1, 2, 3 and 4 may be implemented by a logic circuit (hardware) formed on an integrated circuit (an IC chip) or the like or may be implemented by software using a CPU (Central Processing Unit).

In the latter case, the super resolution image processing apparatuses 1, 2, 3 and 4 include a CPU configured to execute an instruction of a program which is software for implementing each function, an ROM (Read Only Memory) in which the program and various data are recorded readably by a computer (or a CPU) or a storage device (they are referred to as "recording media"), an RAM (Random Access Memory) configured to expand the program, and the like. The computer (or the CPU) reads the program from the recording media and executes the program so that the object of the present invention can be achieved. For the recording media, it is possible to use a "non-temporary physical medium", for example, a tape, a disk, a card, a semiconductor memory, a programmable logic circuit or the like. Moreover, the program may be supplied to the computer through an optional transmission medium capable of transmitting the program (a communication network, a broadcast wave or the like). The present invention can also be implemented by a configuration of a data signal embedded in a carrier wave through which the program is materialized by electronic transmission.

The present invention is not restricted to each of the embodiments but various changes can be made within the scope described in claims. Embodiments obtained by properly combining the technical means disclosed in the different embodiments respectively are also included in the technical scope of the present invention. Furthermore, it is possible to form a new technical feature by combining technical sections disclosed in the embodiments, respectively.

INDUSTRIAL APPLICABILITY

The present invention can be used for an image processing apparatus configured to generate a high resolution image having higher resolution than low resolution images from the low resolution images. Therefore, the present invention can be utilized suitably for a digital image apparatus such as a printer, a scanner, a digital camera, a digital television receiver, a smart phone or a personal computer, a security system using a super resolution technique for an image, and the like.

What is claimed is:

1. An image processing apparatus configured to generate a high resolution image having higher resolution than a plurality of low resolution images from the low resolution images, the image processing apparatus comprising:
a central processing unit configured to control the image processing apparatus to operate as:
a target area setting unit configured to set a target area which is an area to be noted in each of the low resolution images;
an image index estimating unit configured to estimate an image index representing a property of an image in the target area set in each of the low resolution images; and
a selecting unit configured to select any of the low resolution images which are a reference for generating the high resolution image from the low resolution images depending on the estimated image index, the target area setting unit taking a logical sum or a logical product for the target area set in each of the low resolution images between the low resolution images, thereby modifying the set target area.

2. The image processing apparatus according to claim 1 further comprising a weight setting unit configured to set a weight to each of a plurality of target areas set in the low resolution image if the target area setting unit sets a plurality of target areas in the low resolution image, the image index estimating unit estimating the image index of the low resolution image based on the set weight.

3. The image processing apparatus according to claim 1, wherein the target area setting unit performs object detection in each of the low resolution images and sets the target area based on a result of the object detection.

4. The image processing apparatus according to claim 2, wherein the target area setting unit performs object detection in each of the low resolution images and sets the target area based on a result of the object detection.

5. The image processing apparatus according to claim 1, wherein the target area setting unit estimates a saliency area in each of the low resolution images and sets a target area based on the estimated saliency area.

6. The image processing apparatus according to claim 2, wherein the target area setting unit estimates a saliency area in each of the low resolution images and sets a target area based on the estimated saliency area.

7. The image processing apparatus according to claim 2, wherein the target area setting unit performs object detection and estimation of a saliency area and sets target areas depending on results of the object detection and the estimation of the saliency area in the respective low resolution images, and
the weight setting unit sets a weight depending on the target area set by the object detection and the target area set by the estimation of the saliency area.

8. The image processing apparatus according to claim 1, wherein the image index is a blur amount.

9. A method of controlling an image processing apparatus configured to generate a high resolution image having higher resolution than a plurality of low resolution images from the low resolution images, the controlling method comprising:
setting a target area, the target area being an area to be noted in each of the low resolution images;
estimating an image index representing a property of an image in the target area set in each of the low resolution images; and
selecting any of the low resolution images which is a reference for generating the high resolution image from the low resolution images depending on the estimated image index, wherein the target area setting takes a logical sum or a logical product for the target area set in each of the low resolution images between the low resolution images, thereby modifying the set target area.

10. A non-transitory computer-readable recording medium having stored thereon, an image processing program including instructions for generating a high resolution image having higher resolution than a plurality of low resolution images from the low resolution images and to cause a computer to:
set a target area which is an area to be noted in each of the low resolution images;
estimate an image index representing a property of an image in the target area set in each of the low resolution images; and
select any of the low resolution images which is a reference for generating the high resolution image from the low resolution images depending on the estimated image index, wherein the target area setting takes a logical sum or a logical product for the target area set in each of the low resolution images between the low resolution images, thereby modifying the set target area.

* * * * *